(12) United States Patent
Han et al.

(10) Patent No.: US 11,163,982 B2
(45) Date of Patent: *Nov. 2, 2021

(54) FACE VERIFYING METHOD AND APPARATUS

(71) Applicant: Samsung Electronics Co., Ltd., Suwon-si (KR)

(72) Inventors: Seungju Han, Seoul (KR); Minsu Ko, Suwon-si (KR); Deoksang Kim, Hwaseong-si (KR); Chang Kyu Choi, Seongnam-si (KR); Jaejoon Han, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/508,527

(22) Filed: Jul. 11, 2019

(65) Prior Publication Data

US 2019/0332851 A1 Oct. 31, 2019

Related U.S. Application Data

(63) Continuation of application No. 15/888,294, filed on Feb. 5, 2018, now Pat. No. 10,387,714.

(30) Foreign Application Priority Data

Mar. 28, 2017 (KR) ........................ 10-2017-0039202
Jun. 8, 2017 (KR) ........................ 10-2017-0071331

(51) Int. Cl.
*G06K 9/00* (2006.01)
*G06K 9/46* (2006.01)
(Continued)

(52) U.S. Cl.
CPC ..... *G06K 9/00288* (2013.01); *G06K 9/00255* (2013.01); *G06K 9/00281* (2013.01);
(Continued)

(58) Field of Classification Search
CPC .......... G06K 9/00288; G06K 9/00255; G06K 9/00281; G06K 9/0254; G06K 9/6228;
(Continued)

(56) References Cited

U.S. PATENT DOCUMENTS 7,027,620 B2 4/2006 Martinez
7,130,454 B1 10/2006 Berube et al.
(Continued)

FOREIGN PATENT DOCUMENTS

CN 104751108 A 7/2015
CN 105825183 A 8/2016
(Continued)

OTHER PUBLICATIONS

He et al., "Masked Correlation Filters for Partially Occluded Face Recognition", Mar. 2016, IEEE, 2016 IEEE International Conference on Acoustics, Speech and Signal Processing (ICASSP), p. 1293-1297. (Year: 2016).*
(Continued)

*Primary Examiner* — Vincent Rudolph
*Assistant Examiner* — Timothy Choi
(74) *Attorney, Agent, or Firm* — NSIP Law

(57) ABSTRACT

A face verifying method and apparatus. The face verifying method includes detecting a face region from an input image, generating a synthesized face image by combining image information of the face region and reference image information, based on a determined masking region, extracting one or more face features from the face region and the synthesized face image, performing a verification operation with respect to the one or more face features and predeter-
(Continued)

mined registration information, and indicating whether verification of the input image is successful based on a result of the performed verification operation.

5 Claims, 13 Drawing Sheets

(51) Int. Cl.
  *G06K 9/62* (2006.01)
  *G06K 9/20* (2006.01)
(52) U.S. Cl.
  CPC .......... *G06K 9/2054* (2013.01); *G06K 9/4628* (2013.01); *G06K 9/6288* (2013.01)
(58) Field of Classification Search
  CPC .......... G06K 9/629; G06T 2207/20084; G06T 2207/30201; G06T 2207/20121; G06T 2207/20124; G06T 2207/20212; G06T 2207/20216; G06T 2207/20221
  See application file for complete search history.

(56) References Cited

U.S. PATENT DOCUMENTS

| | | | |
|---|---|---|---|
| 10,387,714 B2* | 8/2019 | Han | G06K 9/2054 |
| 2002/0136435 A1 | 9/2002 | Prokoski | |
| 2004/0034611 A1 | 2/2004 | Kee et al. | |
| 2006/0115157 A1 | 6/2006 | Mori et al. | |
| 2010/0215255 A1 | 8/2010 | Xiao et al. | |
| 2011/0135165 A1 | 6/2011 | Wechsler et al. | |
| 2013/0016124 A1 | 1/2013 | Han et al. | |
| 2013/0243274 A1 | 9/2013 | Sukegawa et al. | |
| 2015/0124084 A1* | 5/2015 | Ikenoue | A63F 13/655 |
| | | | 348/135 |
| 2016/0203305 A1 | 7/2016 | Suh et al. | |
| 2017/0032179 A1 | 2/2017 | Al-Qunaieer et al. | |
| 2017/0046562 A1 | 2/2017 | Juefei-Xu et al. | |
| 2018/0137343 A1 | 5/2018 | Liu et al. | |

FOREIGN PATENT DOCUMENTS

| | | |
|---|---|---|
| CN | 105868689 A | 8/2016 |
| JP | 2007-280250 A | 10/2007 |
| JP | 2010-157073 A | 7/2010 |
| JP | 2014-115784 A | 6/2014 |
| JP | 2015-138449 A | 7/2015 |
| JP | 2016-81212 A | 5/2016 |
| KR | 2000-0023915 A | 5/2000 |
| KR | 10-1066097 B1 | 9/2011 |
| KR | 10-2017-0018666 A | 2/2017 |
| WO | WO 2016/050729 * | 4/2016 ............... G06T 5/00 |
| WO | WO 2016/050729 A1 | 4/2016 |

OTHER PUBLICATIONS

Garcia, Christophe et al., "A Neural Architectue for Fast and Robust Face Detection", *Object recognition supported by user interaction for service robots*, vol. 2, Aug. 2002 (pp. 44-47).
Wu, Chenyu et al., "Automatic eyeglasses removal from face images", *IEEE Transactions on Pattern Analysis and Machine Intelligence*, vol. 26, Issue 3, Mar. 2004 (pp. 322-336).
Park, Jeong-Seon, et al., "Glasses Removal from Facial Image Using Recursive Error Compensation", *IEEE Transactions on Pattern Analysis and Machine Intelligence*, vol. 27, No. 5, May 2005 (pp. 805-811).
Tarrés, Francesc et al., "A Novel Method for Face Recognition under partial occlusion or facial expression Variations", *47th International Symposium ELMAR*, Jun. 2005 (pp. 163-166).
Lin, Dahua et al., "Quality-Driven Face Occlusion Detection and Recovery", *2007 IEEE Conference on Computer Vision and Pattern Recognition*, Jun. 2007 (pp. 1-7).
Wang, Zhi-Ming et al., "Reconstruction of Partially Occluded Face by Fast Recursive PCA", *2007 International Conference on Computational Intelligence and Security Workshops (CISW 2007)*, Dec. 2007 (pp. 304-307).
Kotsia, Irene et al., "An Analysis of facial expression recognition under partial facial image occlusion", *Elsevier*, vol. 26, Issue 7, Jul. 2008 (pp. 1052-1067).
Jia, Hongjun et al., "Face recognition with occlusions in the training and testing sets", *2008 8th IEEE International Conference on Automatic Face & Gesture Recognition*, Sep. 17-19, 2008 (pp. 1-6).
Colombo, Alessandro et al., "Three-Dimensional Occlusion Detection and Restoration of Partially Occluded Faces", *Journal of Mathematical Imaging and Vision*, vol. 40, Issue 1, May 2011 (pp. 105-119).
Yang, Meng et al., "Gabor feature based robust representation and classification for face recognition with Gabor occlusion dictionary", *Elsevier*, vol. 46, Issue 7, Jul. 2013 (pp. 1865-1878).
Schroff, Florian et al., "FaceNet: A Unified Embedding for Face Recognition and Clustering", *2015 IEEE Conference on Computer Vision and Pattern Recognition (CVPR)*, Jun. 2015 (pp. 815-823).
Yang, Shuo et al., "From Facial Parts Responses to Face Detection: A Deep Learning Approach", *2015 IEEE International Conference on Computer Vision (ICCV)*, Sep. 2015 (pp. 3676-3684).
Guo, Zhenhua et al., "Face Recognition with Occlusion", *2015 3rd IAPR Asian Conference on Pattern Recognition (ACPR)*, Nov. 2015 (pp. 670-674).
Wen, Yandong et al., "Structured Occlusion Coding for Robust Face Recognition", *Elsevier*, vol. 178, Feb. 20, 2016 (pp. 11-24).
Extended European Search Report dated Jul. 25, 2018 in European Patent Application No. 18164276.0 (7 pages in English).
Korean Office Action dated Aug. 11, 2021 in counterpart Korean Patent Application No. 10-2017-0071331 (6 pages in English, 6 pages in Korean).

* cited by examiner

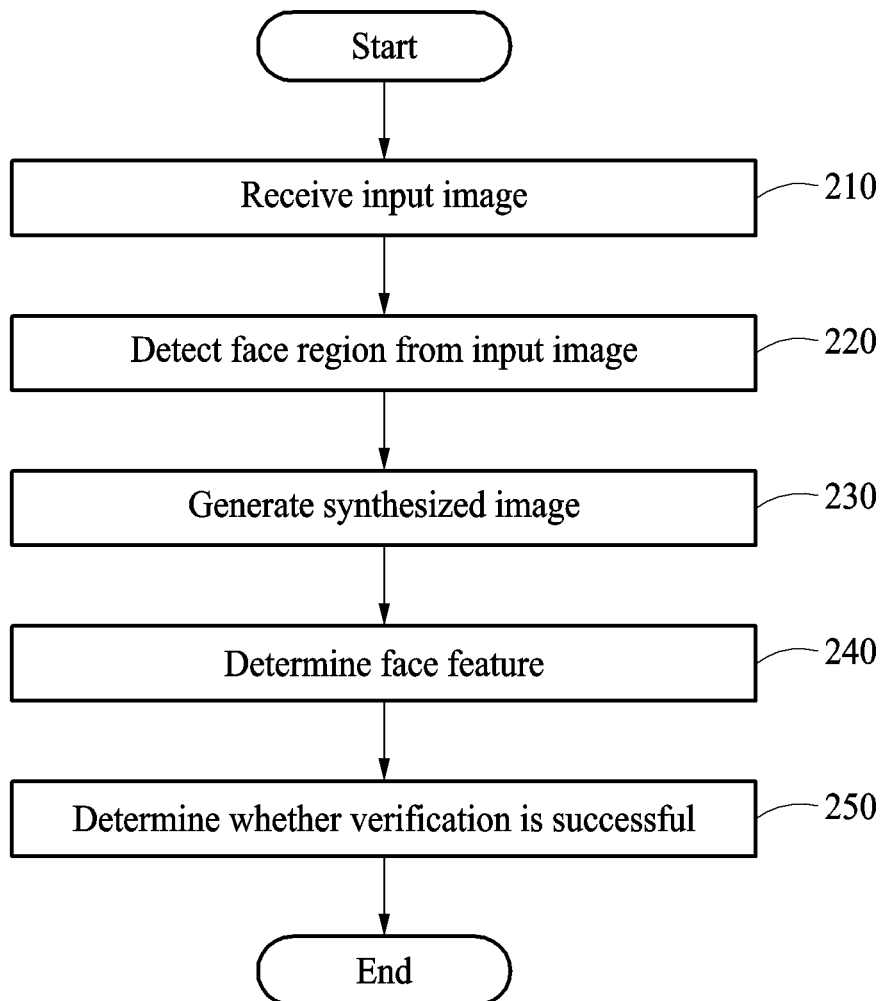

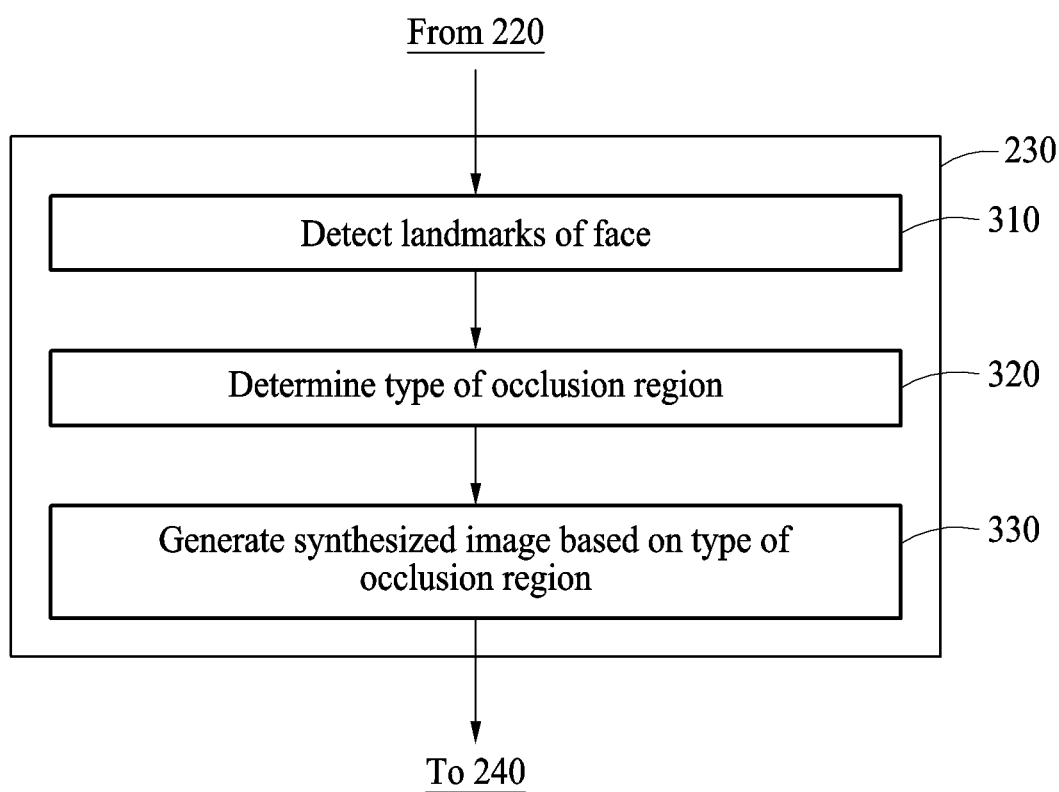

FACE VERIFYING METHOD AND APPARATUS

CROSS-REFERENCE TO RELATED APPLICATION(S)

This application is a continuation of U.S. patent application Ser. No. 15/888,294 filed on Feb. 5, 2018 which claims the benefit under 35 USC § 119(a) of Korean Patent Application No. 10-2017-0039202 filed on Mar. 28, 2017, in the Korean Intellectual Property Office, and Korean Patent Application No. 10-2017-0071331 filed on Jun. 8, 2017, in the Korean Intellectual Property Office, the entire disclosures of which are all respectively incorporated herein by reference for all purposes.

BACKGROUND

1. Field

The following description relates to a face verifying technology.

2. Description of Related Art

A face verifying technology is a biometric authentication technology and may include verifying whether a user is a valid user based on a face represented in a still image or a video. Such face verifying technologies may verify a target without contact with the target.

SUMMARY

This Summary is provided to introduce a selection of concepts in a simplified form that are further described below in the Detailed Description. This Summary is not intended to identify key features or essential features of the claimed subject matter, nor is the Summary intended to be used as an aid in determining the scope of the claimed subject matter.

In one general aspect, a processor implemented face verifying method includes detecting a face region from an input image, generating a synthesized face image by combining image information of the face region and reference image information, based on a determined masking region, extracting one or more face features from the face region and the synthesized face image, performing a verification operation with respect to the one or more face features and predetermined registration information, and indicating whether verification of the input image is successful based on a result of the performed verification operation.

The determined masking region may correspond to a determined occluding object included in the face region or corresponds to a region for the face region that is predicted or predetermined to correspond to known potential occluding objects included in face regions.

The extracting of the one or more face features may include extracting a first face feature from the face region and extracting a second face feature from the synthesized face image, and generating a third face feature based on the first face feature and the second face feature, and the performing of the verification operation may include comparing the third face feature to a registration face feature of a valid user.

The extracting of the one or more face features may include extracting a face feature from a combination of image information from the face region and the synthesized face image, and the performing of the verification operation may include comparing the extracted face feature to a registration face feature of a valid user.

The generating of the synthesized face image may include generating the synthesized face image by synthesizing image information of a region corresponding to the masking region in a reference image with image information of a remaining region excluding the masking region from the face region.

The generating of the synthesized face image may include generating the synthesized face image by replacing image information of a predefined masking region within the face region with the reference image information.

The generating of the synthesized face image may include detecting an occlusion region in the face region, determining an occlusion object type of the detected occlusion region, determining the masking region based on the determined occlusion object type, and generating the synthesized face image by replacing image information within the face region corresponding to the determined masking region in the face image with the reference image information.

The method may further include determining the reference image information, from a reference image, based on the determined masking region.

The determining of the occlusion object type of the detected occlusion region may include detecting landmarks of a face in the face region, and determining the occlusion object type of the occlusion region based on a result of the detecting of the landmarks.

The determining of the occlusion object type may include determining the occlusion object type from among plural occlusion object types of glasses, sunglasses, a hat, and a mask.

The method may further include determining the masking region to have a form of glasses, sunglasses, a mask, or a hat.

The extracting of the one or more face features may include extracting, using a trained neural network feature extractor, a face feature from a face image including the face region and from the synthesized face image.

The method may include training the neural network feature extractor by repeatedly applying training data to a neural network and adjusting parameters of the neural network until the neural network is trained to accurately extract a feature from the training data.

The training of the neural network feature extractor may further include generating the reference image information from the training data.

Image information of a first difference image between the face image and a reference image may be input to a first input layer of the neural network feature extractor, image information of a second difference image between the synthesized face image and the reference image may be input to a second input layer of the neural network feature extractor, and an output layer of the neural network feature extractor may output the extracted face feature, where the verification operation may be performed with respect to the extracted face feature and the predetermined registration information.

The reference image information may be image information determined from training images from which a feature extractor, which performs the extraction of the one or more face features, is trained.

The extracting of the one or more face features may include extracting a first face feature from a first difference image between the face region and a reference image, extracting a second face feature from a second difference image between the synthesized face image and the reference image, and determining a third face feature corresponding to the input image based on the first face feature and the second face feature, where the verification operation may be performed with respect to the third feature and the predetermined registration information.

The first face feature may be extracted by a first feature extractor, and the second face feature may be extracted by a second feature extractor.

The determining of the third face feature may include extracting the third face feature by a third feature extractor.

The reference image information may be a single color.

The performing of the verification operation may include comparing an extracted face feature, from the extracted one or more face features, to a registration feature extracted in a registration operation for a valid user.

The registration feature may be representative of being based on a registration image for face registration and a synthesized registration face image generated in the face registration by replacing image information of a determined registration masking region in the registration image with image information of a reference image corresponding to the reference image information.

The method may further include generating a synthesized registration face image by combining image information of a face region of a registration image and select, based on a determined registration masking region, corresponding reference image information, and extracting the registration feature from the face region of the registration face image and the synthesized registration face image, where the reference image information and the corresponding reference image information may be image information of the reference image.

The registration feature may be representative of being based on a registration image for face registration and a synthesized registration face image generated in the face registration that is synthesized based on plural masking region types.

In one general aspect, provided is a non-transitory computer-readable medium storing instructions, which when executed by a processor, cause the processor to implement one or more or all operations described herein.

In one general aspect, a processor implemented face verifying method includes detecting a face region from a registration image, generating a synthesized face image by combining image information of the face region and reference image information, based on a determined masking region, extracting one or more face features from the face region and the synthesized face image, performing a verification operation with respect to the one or more face features and one or more features extracted based on a verification image, and indicating whether verification of the input image is successful based on a result of the performed verification operation.

The determined masking region may correspond to a determined occluding object included in the face region or corresponds to a region for the face region that is predicted or predetermined to correspond to known potential occluding objects included in face regions.

The extracting of the one or more face features may include extracting a first face feature from the face region and extracting a second face feature from the synthesized face image, and generating a third face feature based on the first face feature and the second face feature, where the performing of the verification operation may include comparing the third face feature to a verification feature, from the one or more features extracted based on the verification image.

The method may further include generating a synthesized verification face image by combining image information of a face region of the verification image and corresponding reference image information, based on a determined verification masking region, and extracting the verification feature from the face region of the verification image and the synthesized verification face image, where the reference image information and the corresponding reference image information may be image information of a same reference image.

The extracting of the one or more face features may include extracting a face feature from a combination of image information from the face region and the synthesized face image, where the performing of the verification operation may include comparing the extracted face feature to a verification face feature, from the one or more features extracted based on the verification image.

The extracting of the one or more face features may include extracting, using a trained neural network feature extractor, a face feature from a face image including the face region and from the synthesized face image.

The method may further include extracting a verification feature, of the one or more features extracted based on the verification image, using the trained neural network feature extractor, and performing the verification operation by comparing the verification feature with the extracted face feature.

Image information of a first difference image between the face image and a reference image may be input to a first input layer of the neural network feature extractor, image information of a second difference image between the synthesized face image and the reference image may be input to a second input layer of the neural network feature extractor, and an output layer of the neural network feature extractor may output the extracted face feature.

In one general aspect, a face verifying apparatus includes a processor configured to detect a face region from an input image, generate a synthesized face image by combining image information of the face region and reference image information, based on a determined masking region, extract one or more face features from the face region and the synthesized face image, and perform a verification operation with respect to the one or more face features and predetermined registration information to indicate whether verification of the input image is successful.

The determined masking region may correspond to a determined, by the processor, occluding object included in the face region or corresponds to a region for the face region that is predicted or predetermined by the processor to correspond to known potential occluding objects included in face regions.

The processor may be configured to generate the synthesized face image by synthesizing image information of a region corresponding to the masking region in a reference image with image information of a remaining region excluding the masking region from the face region.

The processor may be configured to extract a first face feature from a first difference image between the face region and a reference image, extract a second face feature from a second difference image between the synthesized face image and the reference image, determine a third face feature corresponding to the input face based on the first face feature and the second face feature, and perform the verification with respect to the third feature and the predetermined registration information.

In one general aspect, processor implemented face verifying method includes obtaining a face image for verifying the face image, generating a synthesized face image by replacing a region of the face image that is predicted to include an occlusion region with other data, extracting a feature from the face image and the synthesized face image using a trained neural network, and determining whether verification is successful by comparing the extracted feature to a feature of a registered user face.

The region of the face image that is predicted to include the occlusion region may be a region of the face image that is predicted to include glasses, sunglasses, a hat, or a mask.

The generating of the synthesized face image may include generating the synthesized face image without determining whether the occlusion region is present in the face image.

The neural network may include one or more feature extraction layers, where information of the face image and information of the synthesized face image may both be input to a same feature extraction layer, of the one or more feature extraction layers, whose extracted feature results may be determinative of the extracted feature from the face image.

The neural network may include plural feature extraction layers, where information of the face image may be provided to a first layer of the plural feature extraction layers, information of the synthesized face image may be input to a second layer of the plural feature extraction layers, extracted feature results from the first layer and extracted feature results from the second layer may be both input to a third layer of the plural feature extraction layers, and extracted feature results from the third layer may be determinative of the extracted feature from the face image.

The occlusion region may not be included in the face image, and the feature of the registered user face may be extracted based on the face image including the occlusion region.

The occlusion region may be included in the face image, and the feature of the registered user face may be extracted based on the face image not including the occlusion region.

In one general aspect, a computing apparatus includes a camera configured to obtain a face image, and a processor configured to generate a synthesized face image by replacing a region of the face image that is predicted to include an occlusion region with other data, extract a feature from the face image and the synthesized face image using a trained neural network, and determine whether verification is successful by comparing the extracted feature to a feature of a registered user face.

The region of the face image that is predicted to include the occlusion region may be a region of the face image that is predicted to include glasses, sunglasses, a hat, or a mask.

The processor may be configured to generate the synthesized face image without determining whether the occlusion region is present in the face image.

The processor may be configured to implement the neural network to include one or more feature extraction layers, and input both information of the face image and information of the synthesized face image to a same feature extraction layer, of the one or more feature extraction layers, whose extracted feature results are determinative of the extracted feature from the face image.

The processor may be configured to implement the neural network to include plural feature extraction layers, and to input information of the face image to a first layer of the plural feature extraction layers, input information of the synthesized face image to a second layer of the plural feature extraction layers, and input both extracted feature results from the first layer and extracted feature results from the second layer to a third layer, of the plural feature extraction layers, whose extracted feature results are determinative of the extracted feature from the face image.

The occlusion region may not be included in the face image, and the feature of the registered user face may be extracted based on the face image including the occlusion region.

The occlusion region may be included in the face image, and the feature of the registered user face may be extracted based on the face image not including the occlusion region.

In one general aspect, a processor implemented face verifying method includes detecting a face region from an input image, extracting one or more face features from image information of the face region and reference image information corresponding to a determined occlusion masking region, performing a verification operation with respect to the one or more face features and predetermined registration information, and indicating whether verification of the input image is successful based on a result of the performed verification operation.

The extracting of the one or more face features may be performed by one or more trained neural network layers, trained based on training data, and the reference image information may be derived from the training data.

The determined occlusion masking region may correspond to one or more determined occluding objects included in the face region and/or correspond to one or more regions for the face region that are predicted or predetermined to correspond to known potential occluding objects included in face regions.

The extracting of the one or more face features may include extracting a first face feature from the face region and extracting a second face feature from a combination of the image information of the face region and the reference image information corresponding to the determined occlusion masking region, and generating a third face feature based on the first face feature and the second face feature, where the performing of the verification operation may include comparing the third face feature to a registration face feature of a valid user.

The method may further include generating a synthesized face image by combining the image information of the face region and the reference image information, where the extracting of the second face feature may include extracting the second face feature from the generated synthesized face image.

The determined occlusion masking region may correspond to two or more determined occluding objects included in the face region and/or correspond to two or more regions for the face region that are predicted or predetermined to correspond to known potential occluding objects included in face regions.

The method may include generating a synthesized face image by combining the image information of the face region and the reference image information, and the extracting of the one or more face features may include extracting the one or more face features from the generated synthesized face image.

Other features and aspects will be apparent from the following detailed description, the drawings, and the claims.

BRIEF DESCRIPTION OF THE DRAWINGS

FIG. 2 is a flowchart illustrating an example of a face verifying method.

FIG. 3 is a flowchart illustrating an example of a process of generating a synthesized face image.

Figure 1:
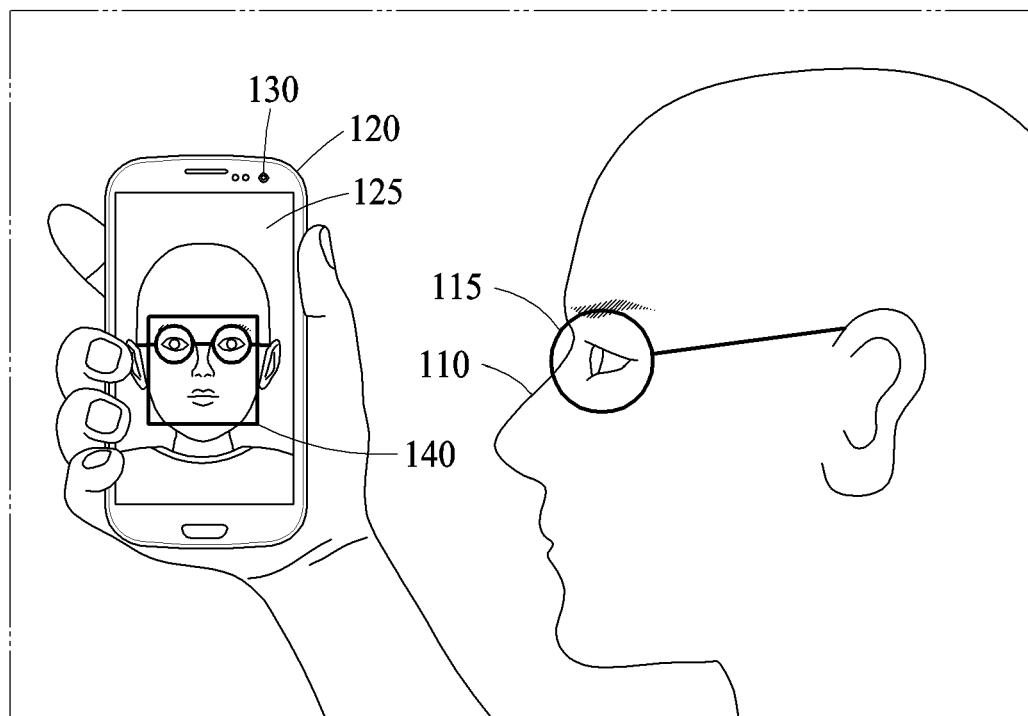
FIG. 1 illustrates an example of face verification.

Throughout the drawings and the detailed description, unless otherwise described or provided, the same drawing reference numerals will be understood to refer to the same or like elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. The sequences of operations described herein are merely examples, and are not limited to those set forth herein, but may be changed as will be apparent after an understanding of the disclosure of this application, with the exception of operations necessarily occurring in a certain order. Also, descriptions of functions and constructions that are known may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

The following specific structural or functional descriptions are exemplary to merely describe the examples, and the scope of the examples is not limited to the descriptions provided in the present specification. Various changes and modifications can be made thereto by those of ordinary skill in the art.

Although terms of "first" or "second" are used to explain various components, the components are not limited to the terms. These terms should be used only to distinguish one component from another component. For example, a "first" component may be referred to as a "second" component, or similarly, and the "second" component may be referred to as the "first" component within the scope of the right according to the concept of the present disclosure.

As used herein, the singular forms are intended to include the plural forms as well, unless the context clearly indicates otherwise. For example, as used herein, the singular forms "a," "an," and "the" are intended to include the plural forms as well, unless the context clearly indicates otherwise. It should be further understood that the terms "include", "comprise", and/or "have," when used in this specification, specify the presence of stated features, integers, operations, elements, components or a combination/group thereof in an example embodiment, but do not preclude the presence or addition of one or more other features, integers, operations, elements, components, and/or combinations/groups thereof in alternative embodiments, nor the lack of such stated features, integers, operations, elements, components, and/or combinations/groups in further alternative embodiments unless the context and understanding of the present disclosure indicates otherwise. In addition, the use of the term 'may' herein with respect to an example or embodiment, e.g., as to what an example or embodiment may include or implement, means that at least one example or embodiment exists where such a feature is included or implemented while all examples and embodiments are not limited thereto.

Unless otherwise defined herein, all terms used herein including technical or scientific terms have the same meanings as those generally understood by one of ordinary skill in the art consistent with and after an understanding of the present disclosure. Terms defined in dictionaries generally used should be construed to have meanings matching with contextual meanings in the related art and the present disclosure and are not to be construed as an ideal or excessively formal meaning unless otherwise defined herein.

FIG. 1 illustrates an example of face verification.

The face verification refers to a method of verifying whether a user is a valid user based on a face of the user attempting at verification. For example, the face verification is used to verify a valid user in a user-login, a payment service, or an access control. Referring to FIG. 1, a face verifying apparatus configured to perform face verification is included in a computing apparatus 120. The computing apparatus 120 includes, for example, a smartphone, a wearable device, a tablet computer, a netbook, a laptop, a desktop, a personal digital assistant (PDA), a set-top box, a home appliance, a biometrics-based door lock, a security device, or a vehicle start device.

The computing apparatus 120 may verify a user 110 attempting to have an access to the computing apparatus 120 through face verification. For example, when the user 110 is attempting at face verification to the computing apparatus 120, e.g., to cancel a lock state of the computing apparatus 120, the computing apparatus 120 obtains a face image 140 of the user 110 using an image obtaining apparatus, for example, a camera 130, and determines whether to cancel the lock state of the computing apparatus 120 by analyzing the obtained face image. In such an example, if a determined similarity between features extracted from a registration image and feature extracted from a verification image meets a predetermined threshold, then the user may be determined to be a valid user of the computing apparatus 120, the user may be permitted to gain access to a restricted area, or the user may be authorized to implement a financial transaction or payment, etc. The user may be notified of the successful verification through the display 125, or the example further operations may then be available through the display 125.

In an example, the computing apparatus 120 extracts a face feature from the face image using a feature extractor, and determines whether the face verification is successful based on a result of the comparing of the extracted face feature to the example registration feature registered in a face registering process, e.g., of the same or different computing apparatus 120. The feature extractor refers to a hardware implemented model that outputs feature information, for example, a feature vector or a probability value, based on input information. In an example, the feature extractor refers to a trained neural network, trained based on training data. In an example, the example neural network may be a single trained neural network, or may be made up of multiple trained neural networks. In the above example, in response to the face verification being successful, the user 110 may successfully cancel the lock state of the computing apparatus 120. Rather, in response to a determined failure of the face verification, the user 110 may be unable to cancel the lock state of the computing apparatus 120, and the computing apparatus 120 may maintain to operate in the example lock state, or the user may not be permitted to gain access to restricted area, or the user may not be permitted to perform financial or payment operations.

For face verification, at least a face of the user 110 may be photographed using the example camera 130. Here, as illustrated in FIG. 1, glasses 115 may be occluding obstacles, elements, or objects that may typically interrupt an accurate judgment of face verification when the user 110 wears the glasses 115. In another case, the occluding obstacles may be sunglasses, a mask (e.g., health mask), or a hat that may typically interrupt an accurate judgment when the user 110 wears the sunglasses, the mask, or the hat. Typically, any or all of such occluding obstacles of the glasses 115, the sunglasses, the mask, or the hat may exist in the captured face image, and thus each or collectively may typically negatively affect the reliability and accuracy of face verification by a computing apparatus because the occluding obstacles may block the detection or observability of unique features typically used to verify the user 110, or unique features for which a corresponding verification process may typically rely upon due to extracted features from registration images during a corresponding registration process. In addition, typically, the various types and shapes of the glasses 115, the sunglasses, the mask, or the hat, in addition to whether the user 110 wears the example glasses 115, the sunglasses, the mask, or the hat, may also affect the result of such face verification.

For example, typically when the user 110 wears the glasses 115 and attempts at such face verification after a face registering process has been performed in a state in which the user 110 did not wear the glasses 115, a false rejection may occur due to presence of the glasses 115 because the glasses 115 are not considered to determine a registration feature in the corresponding typical face registering process. Likewise, typically, when the user 110 does not wear glasses 115 and attempts at the typical face verification after such face registering process is performed in a state in which the user 110 wears the glasses 115, the false rejection may occur due to non-presence of the glasses 115 in the verification image. Thus, there exist technological problems in such typical verification technological approaches, at least in that such occlusion differences in registration and verification feature extraction may result in false rejections and computing apparatuses, for example, may not properly operate based on the actual accuracy or veracity of the underlying subject under review. As only non-limiting examples, discussions of one or more technological solutions to such failings of current approaches are provided below, and thus, may provide one or more solutions in the computing apparatus 120 that enhance the recognition rate during face verification by performing face verification that may be less sensitive to face occlusion aspects, for example, glasses 115, or may be more robust against face occlusion aspects using the computing apparatus 120, as further discussed below in FIGS. 2-9.

FIG. 2 is a flowchart illustrating an example of a face verifying method.

Referring to FIG. 2, in operation 210, a face verifying apparatus receives an input image.

The input image is input to the face verifying apparatus, and represents an input face being a target of face verification. The input verification image may be obtained by an image obtaining apparatus, for example, a digital still camera, a video camera, and/or other sensor, may be externally provided, or may be acquired from or provided by a local memory or other processing operation of the face verifying apparatus.

Figure 7:
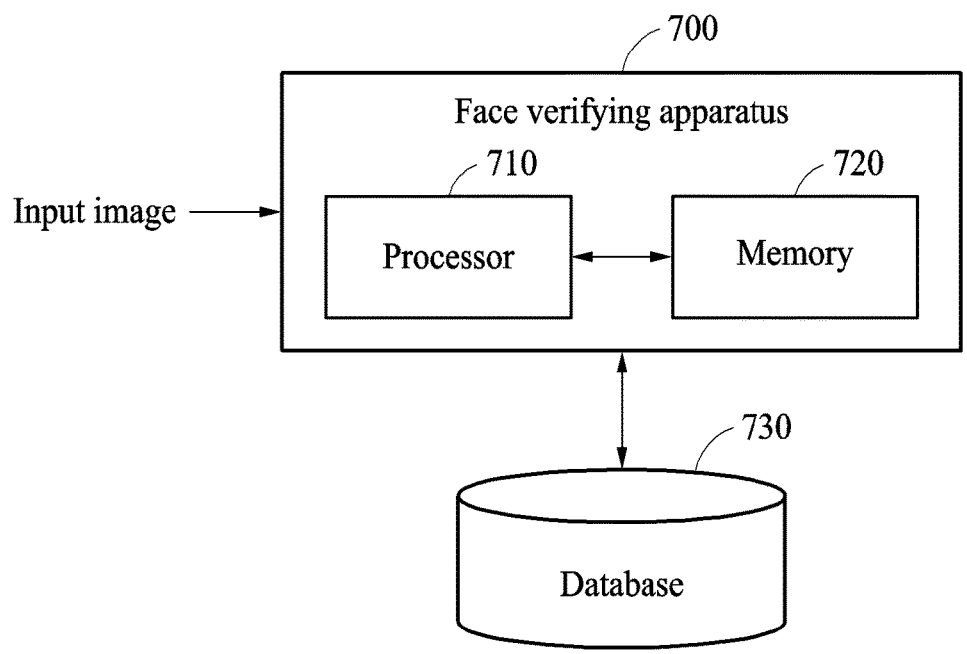
FIG. 7 is a block diagram illustrating an example of a face verifying apparatus.
Figure 8:
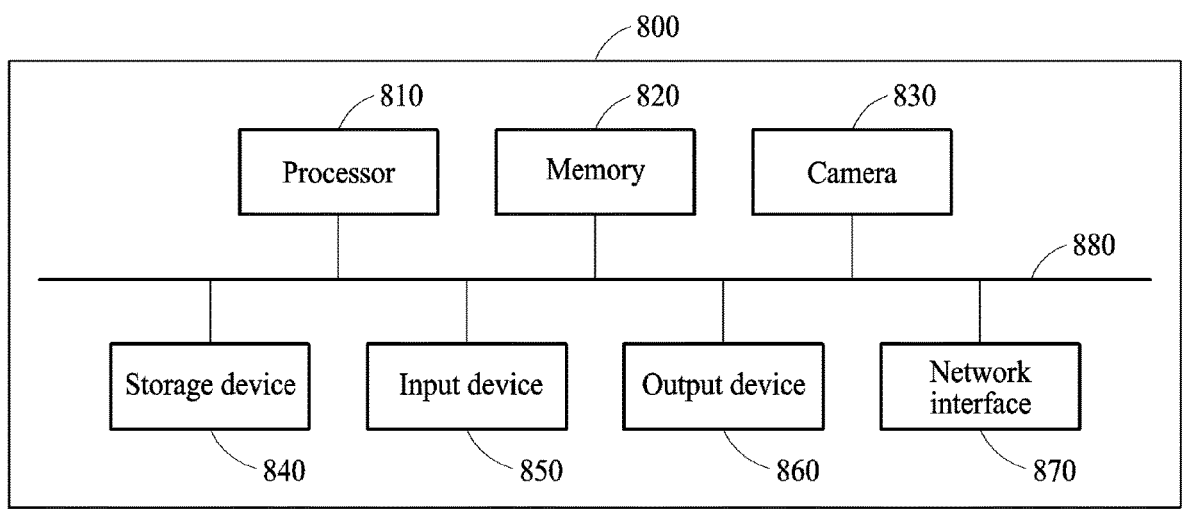
FIG. 8 is a block diagram illustrating an example of a computing apparatus.
Figure 9:
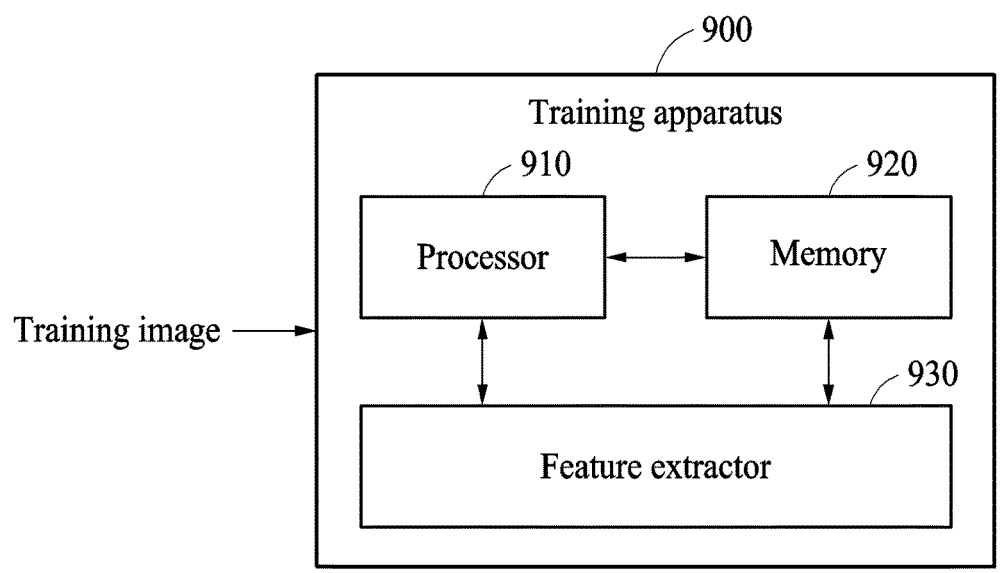
FIG. 9 is a block diagram illustrating an example of a training apparatus.

In examples, such as the computing apparatus 120 of FIG. 1, the face verifying apparatus 700 of FIG. 7, computing apparatus 800 of FIG. 8, and training apparatus 900 of FIG. 9, each of which herein can individually and collectively be referred to as respective face verifying apparatuses, each face verifying apparatus includes one or more processors configured to perform face verification based on one or more verification images and to output a verification result and/or perform face registration based on one or more registration images. The verification result indicates, e.g., either through explicit or inferential indications, whether a face included in the verification image corresponds to a valid user, for example. For example, when the face included in the verification image corresponds to the valid user, the verification result may include information indicating that verification has succeeded, and when the face included in the verification image does not correspond to the valid user, the verification result may alternatively include information indicating that the verification has failed. Alternatively, such as where face verification is automatically performed or performed in a background operation, e.g., without request or potential knowledge of the user, a successful or failed verification result may not be explicitly reported to the user, but the successful or failure indications may be through inferential operations to control/institute additional operations (or non-operation of the same), or output results may be explicitly indicated to another device or server that may receive or monitor results of the face verification or results of face verifications of one or more captured faces from one or more such facial verification apparatuses. Thus, the verification result may be indicated through, and used for, implementing or initiating of further processing of the facial verification apparatus, such as further processing operations in which user verification may be beneficial or required. As only examples, when the face included in the verification image is verified as a face of the valid user by the face verifying apparatus, the face verifying apparatus may unlock a user interface of the face verifying apparatus, such as when the face verifying apparatus is a user terminal, e.g., a smart phone or tablet, and the unlocking enables the user to access additional information or perform additional functions of user terminal, or the face verifying apparatus may control or indicate to an external device to permit entry of a user to a restricted area due to the face verification, or may authorize financial or payment transactions to proceed or be initiated, as well as alternative operations or processes depending on embodiment.

The face verification is performed by comparing information on one or more verification images to information on one or more registration images. For example, a valid user registers a face image with the face verifying apparatus through the capturing of a registration image, e.g., by the face verifying apparatus, either automatically or upon user control. As non-limiting examples, the processor of the face verifying apparatus may be one or more processors of the face verifying apparatus that control additional operations of the example user terminal, or may be specialized processors specially configured for the face verification, e.g., as a GPU, reconfigurable processor, or specialized neural network or machine learning accelerated processor. When in the verification process of the face verifying apparatus the input image may be referred to as the verification image, while in the registration process of the face verifying apparatus the input image may be referred to as the registration image. In the registration process, the face verifying apparatus extracts features from the face of the valid user and stores the extracted features. The neural network configuration for extracting features may also be trained previously using training data. When the user registration is completed, and when a verification image is received, the face verifying apparatus may analyze the verification image, extract feature(s) from the face of the user in the verification image, and perform the face verification by comparing the feature(s) extracted from the verification image and feature(s) of the registration image(s) stored in advance based on a verification threshold, for example.

The face verifying apparatus may be configured to perform one or more or all neural network verification trainings, registration operations herein without verification, one or more or all verification operations herein without performing the registration, or may be configured to perform any one or any combinations of the training, registration operations, and verification operations. In an example, one face verifying apparatus may capture a registration image, that face verifying apparatus or another face verifying apparatus may perform image registration, and that face verifying apparatus, the other face verifying apparatus, and/or still another face verifying apparatus may capture the verification image, and any of the face verifying apparatuses or still a further face verifying apparatus may perform the verification of the verification image based on the registered image, e.g., as registered and stored by any of such face verifying apparatuses. Any of the face verifying apparatus may train the extractor or verification models or neural networks, or still another face verifying apparatus may perform the training. Such face verifying apparatuses may be in communication and share, or respectively provide from respective storing of the same, any trained parameters, any registration image(s), any other image registration information including corresponding extracted features, any verification images, any other verification information including corresponding extracted features, and/or results validation results of the verification processes. Thus, though examples below may refer to a face verifying apparatus acquiring a registration image, performing registration, acquiring a verification image, and performing verification as well as additional operations such as the training or other operations, embodiments are not limited to a single face verifying apparatus generating all such data, performing all such operations, or authorizing or implementing further operations of functions of a/the user device based on success or non-success results of the verification.

In such examples, the face verifying apparatus may also be configured to perform image preprocessing on an input image. The image preprocessing process may include at least one process of processing the input image to be more suitable in a predetermined manner for training, face verification, and/or registration. For example, the preprocessing process may include a process of adjusting a size of an input image, a process of rotating an input image, a process of removing a noise from an input image, a process of increasing a contrast of an input image, a deblurring process of removing a blur from an input image, a process of removing a background region, a warping process of correcting a distortion in an input image, a process of cropping a predetermined region in an input image, or a process of performing binarization on an input image. Hereinafter, regardless of whether such image preprocessing is performed, hereafter references to the "input image" may be understood to refer to the input image on which image preprocessing has been performed when the preprocessing is performed and understood to refer to the input image without image preprocessing when the preprocessing is not performed.

Thus, in operation 220, the face verifying apparatus may detect a face region from the input image. As only examples, the face verifying apparatus may detect a face region using a Haar-based cascade AdaBoost classifier or a Viola-Jones detector. However, the examples are not limited thereto. The face verifying apparatus may detect the face region based on various face region detecting schemes. Such as discussed further below, a face image may be obtained from the input image. Some of the aforementioned preprocessing operations may also be performed to obtain the face image, e.g., such as by normalizing, cropping, affine transforming, and/or image transforming the input image such as to include solely or primarily the detected face region, as only examples.

In operation 230, the face verifying method generates a synthesized face image by combining aspects of the face image and aspects of a reference image, based on a masking region with respect to the face image and the reference image. For example, the masking region in the synthesized face image corresponds to one or more regions of which image information of the input image has been replaced by image information of a reference image, reference pattern(s), or reference value(s), that are selected for reducing an influence of a face occlusion element or object that may exist on the face in the face image and/or that may not originally exist in the face image but which consideration of may help increase verification accuracy. In an example, the face verifying apparatus generates the synthesized face image by synthesizing image information of a region corresponding to the masking region in the example reference image and image information of a remaining region excluding the masking region from the face image. Thus, the region corresponding to the masking region in the synthesized face image represents the image information of the example reference image, and the remaining region excluding the masking region represents the image information of the face image. As only examples, the respective image information may indicate pixel values, for example, color values or brightness values, of image pixels. Thus, the synthesized face image may be generated by combining the input image with other data, for example, by replacing a region of the input image that may be determined, predicted, or previously determined to be more likely or often to have an occlusion region with other data. For example a region that is predicted to have the occlusion region may be, for example, a region that is determined or predicted to have glasses, sunglasses, a hat, or a mask, or a region that often includes such occlusionary regions or features. For example, the face verifying apparatus may generate the synthesized face image based on one or more such masking regions without verifying whether the corresponding occlusion region(s) are actually present in the face image.

In an example, a position and a form of the masking region may be predefined based on a type of a face occlusion element (or, region that is predicted to have an occlusion) of which an influence on a result of the face verification is to be reduced. Reducing the influence of an occlusion element or region on the result of the face verification may correspond to less verification rejections for the same user regardless of whether the user's image includes such occlusionary aspects during the registration and/or verification processes. For example, when an influence of glasses (or sunglasses) is to be reduced on the accuracy of the face verification process, a position (position at which glasses or sunglasses are estimated to be present) for a masking region may be determined based on a position of an eye detected from the face region, and a masking region may be determined with a form similar to a determined form of the glasses (or sunglasses). Thus, the synthesized face image may be formed by mixing image information from the face image with image information of the example reference image corresponding to the masking region. In another example, when an influence of a mask (e.g., health mask) is to be reduced in the face verification, a position (position at which mask is estimated to be present) for a masking region may be determined based on a position of a nose or a mouth detected from the face region, and a masking region may be determined with a form similar to a determined form of the mask. In still another example, when an influence of a hat is to be reduced in the face verification, a position (position at which hat is estimated to be present) for a masking region may be determined based on a position of an eye or eyebrow detected from the face region, and a masking region may be determined with a form similar to a determined form of the hat to be represented in the face region. Again, the face verifying apparatus generates the synthesized face image by replacing image information of a predefined masking region in the input image with the image information of the reference image, pattern(s), or value(s). In the present disclosure, the synthesized face image may be generated in either or both of the registration process and the verification process by replacing a defined masking region with such other reference data, for example, image information of the reference image, based on detected eyes, eyebrows, a nose, a mouth, a chin, ears, hair, contour of face, or other features in the input or face image when the occlusion region by the face occlusion element is determined to be present in the face region and even when such an occlusion region by a face occlusion element is not actually present or not even detected for in the face region.

In an example, a plurality of masking regions including, for example, a masking region corresponding to glasses and a masking region corresponding to a hat, may be implemented in the generating of one or more synthesized face images. For example, image information of plural masking regions in the input image may be respectively replaced with image information of corresponding regions in the reference image when a single corresponding synthesized face image is generated, or any combination of masking regions may be implemented for generating plural corresponding synthesized face images.

In another example, the position and the form of the masking region(s) may be determined based on a determined type of the occlusion region detected from the face region of the input image. Related more detailed descriptions will be provided further below with reference to FIG. 3.

In an example, the reference image may be a predefined image used to generate the synthesized face image. The above reference image may be used to generate the synthesized face image for face registration in a face registering process, and may thus be similarly used for the face verification of the face verifying process. In an example, the reference image may be determined based on training images used for training the feature extractor that is implemented in the registration and/or verification processes, such as the training images that are used to train the extraction model or neural network which will subsequently be used in the registration and verification processes discussed further below with respect to FIGS. 6A-6D and 9, as only examples.

For example, the reference image may be an average image or an average value image of the training images. The average image may be generated by averaging pixel values of corresponding positions in the training images, for example. The average value image may be generated by averaging pixel values of all pixels included in the training images and allocating the average pixel values to all pixels. A form may be represented in the average image because a pixel value may differ from each pixel position, but a form may not be represented in the average value image because all pixels may have a same pixel value. However, a form of the reference image is not limited thereto. The form of the reference image may vary. For example, the reference image may also be a single color image which has a same color in an entire region regardless of the training images, or the reference image, pattern(s), or value(s) may be determined through alternate approaches.

In operation 240, the face verifying apparatus determines a face feature corresponding to the input face based on the face image and the synthesized face image. For example, the face verifying apparatus extracts a feature corresponding to a user face from the face image and from the synthesized face image using a feature extractor based on the example trained model or neural network. For example, the feature extractor may output a feature value corresponding to input information as the face feature. In an example, image information of a first difference image between the face image and the reference image, and image information of a second difference image between the synthesized face image and the reference image may be respectively or collectively input to the feature extractor. The first difference image may be generated by subtracting a pixel value of a corresponding position of the reference image from each pixel value of the face image. The second difference image may be generated by subtracting the pixel value of the corresponding position of the reference image from each pixel value of the synthesized face image. In another example, the image information of the first difference image and the image information of the second difference image are input to different feature extractors, and the face feature corresponding to the input face is determined based on a first face feature and a second face feature respectively output from the feature extractors. The feature extractor may be trained in advance prior to the face registering process, with further detailed descriptions of the training of the feature extractor be provided below with respective references to FIGS. 6A-6D and FIG. 9, for example.

In operation 250, the face verifying apparatus may determine whether verification is successful based on the determined face feature. For example, the face verifying apparatus may determine whether the verification is successful based on a result of comparing the face feature determined in operation 240 to a stored registration feature (feature of registered user face). The face verifying apparatus may determine a probabilistic similarity, for example, between the determined face feature and the registration feature, and determine whether a user represented in the input face is a valid user based on the determined similarity. As a difference between the face feature and the registration feature increases, the similarity decreases. As the difference between the face feature and the registration feature decreases, the similarity increases. In an example, the face verifying apparatus determines that the verification is successful in response to the similarity meeting or being greater than a verification threshold value, and determines that the verification has failed in response to the similarity not meeting or being less than or equal to the verification threshold value.

The registration feature may indicate the face feature of the valid user registered in the face registering process. As noted, a corresponding synthesized face image may also be generated in the registering process by replacing image information of a predefined masking region in a registration face image, in which a face to be registered is represented, with the image information of the reference image. The registration feature may thus be determined based on the generated synthesized face image and the registration face image. The processes of determining the registration feature may be the same or similar to the above described process of determining the face feature in operations 220 through 240. In an example, the registration feature includes registration features respectively corresponding to masking region types. For example, similar to the extracting of features for verification face images, one or more of the registration features may be extracted respectively corresponding to registration face images where glasses, sunglasses, a mask, and/or a hat are not present, and/or corresponding to registration face images where such glasses, sunglasses, mask, and/or hat are present, and synthesized registration face images where masking regions are represented by reference data for registration face images where such occluding elements or objects are and/or are not present.

As described above, the synthesized face image may be generated based on the masking region and the face registration and/or verification may be performed based on the correspondingly generated synthesized face image and the corresponding face image such that a result of the face verification may be less influenced due to occlusion regions by face occlusion elements or objects in the verification image. Thus, compared to typical approaches, an accuracy in face verification may be prevented from decreasing based on a form and a position of a face occlusion element or object in a registration and/or verification image and whether the face occlusion element is present in the registration or verification image.

FIG. 3 is a flowchart illustrating an example of a process of generating a synthesized face image.

In an example, a face verifying apparatus detects whether an occlusion region is present in a face region, and generates a synthesized face image of a face image and a reference image based on a determined masking region corresponding to a determined type of the occlusion region. Related descriptions will be provided below. Here, as illustrated in FIG. 3, operations of FIG. 3 may correspond to operation 230 of FIG. 2, for example, though embodiments are not limited thereto.

Referring to FIG. 3, in operation 310, the face verifying apparatus may detect landmarks of a face from the detected face region, such as in the detected face region of an input image or the face image, e.g., either in the registration or verification processes. The face verifying apparatus may detect the landmarks of the face from the face region using a landmark detecting scheme based on, for example, an active contour model (ACM), an active shape model (ASM), an active appearance model (AAM), a supervised descent method (SDM), or a neural network model. The landmarks of the face may be feature points of major facial parts. For example, the landmarks may be feature points for identifying major facial parts such as an eyebrow, an eye, a nose, a mouth, a chin, an ear, hair, or a contour of face, as only examples.

In operation 320, the face verifying apparatus detects for an occlusion region in the face region based on a result of the detecting the landmarks, and determines the type of the occlusion region if detected. For example, in response to a determination that a landmark of a region (for example, eyebrow) around an eye has not been detected from the face region, an occlusion may be detected and a type of the occlusion region may be determined to be glasses. In addition, in response to a determination that a landmark of an eye region has not been detected, an occlusion may be detected and the type of the occlusion region may be determined to be sunglasses. In response to a determination that landmarks of a mouth region, a region around a mouth, and/or a nasal tip region have not been detected, an occlusion may be detected and the type of the occlusion region may be determined to be a mask (e.g., a health mask). Also, in response to a determination that a landmark of a hair region has not been detected, an occlusion may be detected and the type of the occlusion region may be determined to be a hat.

In response to an occlusion region not being detected in the face region, the synthesized face image may be generated based on any of the predefined masking regions as described with reference to FIG. 2 and further discussed below with respect to FIGS. 4A-5, as only examples.

In operation 330, the face verifying apparatus generates the synthesized face image of the corresponding face image and a reference image based on the determined type of the occlusion region. The face verifying apparatus generates the synthesized face image by replacing image information of the masking region corresponding to the type of the occlusion region in the face image with image information of the reference image. For example, in response to the type of the occlusion region being determined to be the glasses, the face verifying apparatus generates the synthesized face image by replacing image information of a masking region corresponding to glasses in the face image with the image information of the reference image. In another example, in response to the type of the occlusion region being determined to be a mask, the face verifying apparatus generates the synthesized face image by replacing information of a masking region corresponding to the mask with the image information of the reference image. In addition, in an example, a form of the determined occlusion region may be determined and the masking region may be generated with a determined same or similar form as the determined occlusion region.

FIGS. 4A through 4D illustrate examples of a face registering process and a face verifying process.

Figure 4A:
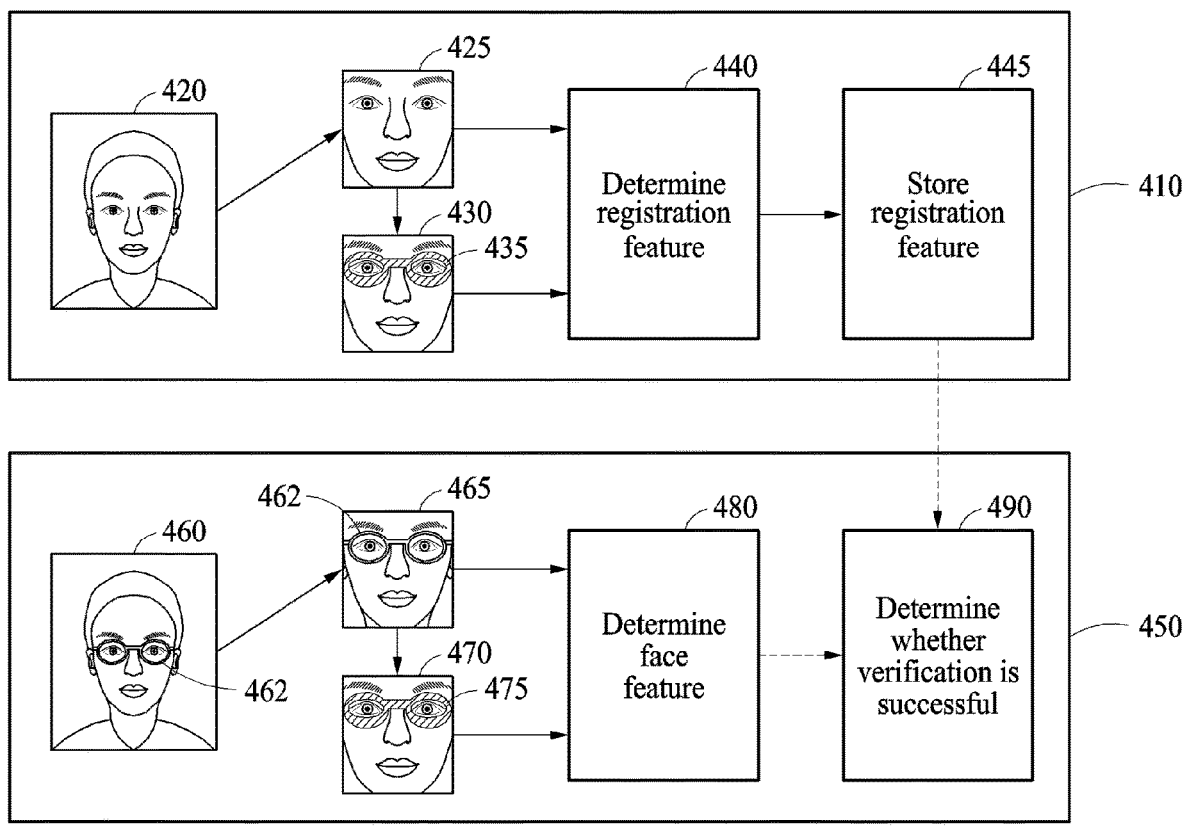
FIGS. 4A through 4D illustrate examples of a face registering process and a face verifying process.

FIG. 4A illustrates an example of extracting a feature of a registered user face based on a face image not including an occlusion region in a face registering process 410 and an example of extracting a feature extracted for face verification based on a face image including an occlusion region in a face verifying process 450. For example, face registration is performed when a user does not wear glasses in the face registering process 410, and face verification is performed when a user wears glasses 462 in the face verifying process 450.

In the face registering process 410, a face of a valid user is registered. In an example, a registration image 420 is obtained by photographing a face of a user using a camera for face registration. A face region is detected from the registration image 420, and a face image 425 representing the detected face region is obtained. To obtain the face image 425, an image normalization process, for example, image cropping, affine transforming, or image scaling, may be performed, as discussed above with respect to FIG. 2.

Subsequently, a synthesized face image 430 is generated based on the face image 425. The synthesized face image 430 may be generated by replacing image information of a region corresponding to a masking region 435 in the face image 425 with image information of a reference image. A process of generating the synthesized face image 430 may be the same or similar to a processing process in operation 230 of FIG. 2 and operations of FIG. 3. FIG. 4A illustrates an example in which the masking region 435 is defined as a glasses type, as only an example. As shown in the registration image 420, the synthesized face image 430 may be generated based on the masking region 435 corresponding to a predefined glasses type even though the user is not wearing glasses in the registration image 420.

A registration feature may be determined based on both the face image 425 and the synthesized face image 430 in operation 440, and the determined registration feature may be stored in operation 445, such as in a memory of the verifying apparatus. The registration feature may be determined by a feature extractor implemented through a neural network or other model, for example. A process of determining the registration feature in operation 440 may be the same or similar to the extracting of the verification feature in operation 240 of FIG. 2, for example. Here, although a face feature to be compared to the verification feature is determined in operation 240 of FIG. 2, the registration feature for registering a face of a valid user may be similarly determined in the face registering process 410. Multiple features may be extracted for one or more registration images and one or more corresponding synthesized face images for each registration image.

In the face verifying process 450, it may be determined whether a user attempting at the face verification is the valid user. In an example, a verification image 460 in which a verification target is represented may be obtained by photographing a face of a user using a camera for the face verification. The face region may be detected from the verification image 460, and a face image 465 representing the detected face region may be obtained. In an example, an image normalization process may also be performed for obtaining the face image 465 from the verification image 460.

Subsequently, one or more synthesized face images 470 may be generated based on processing processes the same or similar to those in operation 230 of FIG. 2 and operations of FIG. 3. A synthesized face image 470 may be generated by replacing image information of a region corresponding to a masking region 475 with image information of a reference image. Here, the region corresponding to the masking region 475 may be determined from the face image 470, e.g., with a form corresponding to the example occluding glasses in face image 470. Thus, in the resulting synthesized face image 470, the glasses 462 are not represented, but rather they have been replaced by the masking region 475 having image information of a reference image, for example.

Based on the same or similar processing processes as in operation 240 of FIG. 2, for example, a face feature may then be extracted from the face image 465 and the synthesized face image 470 in operation 480. Here, the feature extractor may be used to determine the face feature. The reference image and the feature extractor used in the face registering process 410 may also be used in the face verifying process 450. Subsequently, in operation 490, it may be determined whether verification is successful based on a result of a comparing of the resultant face feature from operation 480 to the registration feature registered in the face registering process 410. For example, in response to a similarity between the face feature and the registration feature meeting or being greater than a verification threshold value, the verification is determined to be successful. In response to the similarity between the face feature and the registration feature not meeting or being less than or equal to the verification threshold value, the verification is determined to have failed.

Figure 4B:
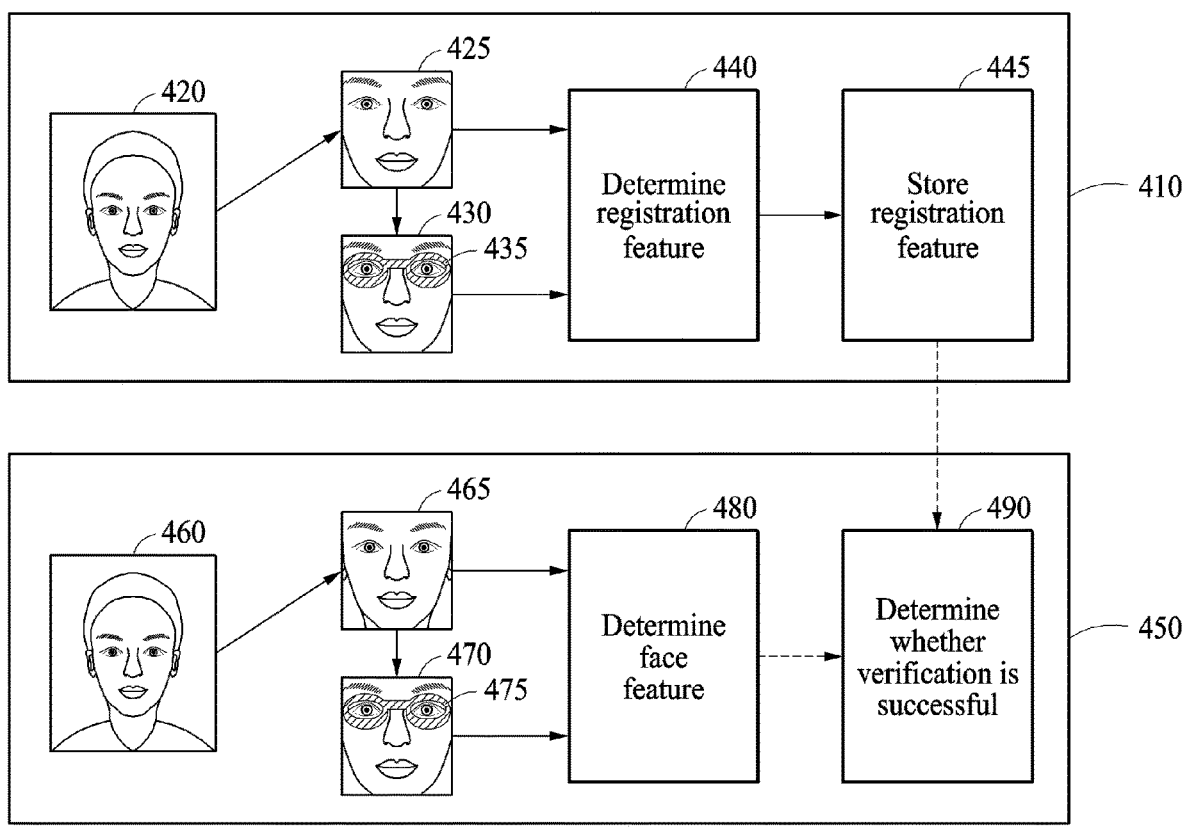

FIG. 4B illustrates an example of again performing the face registration when a user does not wear glasses in the face registering process 410 similar to the operation of FIG. 4A, and performing the face verification when a user also does not wear glasses in the face verifying process 450. Even though the respective users represented in the input images 420 and 460 are not wearing glasses in the respective face registering process 410 and face verifying process 450, the corresponding synthesized face images 430 and 470 are each generated based on predefined masking regions 435 and 475, and thus, the corresponding extracted face features may be similarly respectively determined based on the synthesized face images 430 and 470 and the face images 425 and 465 in operations 440 and 480.

Figure 4C:
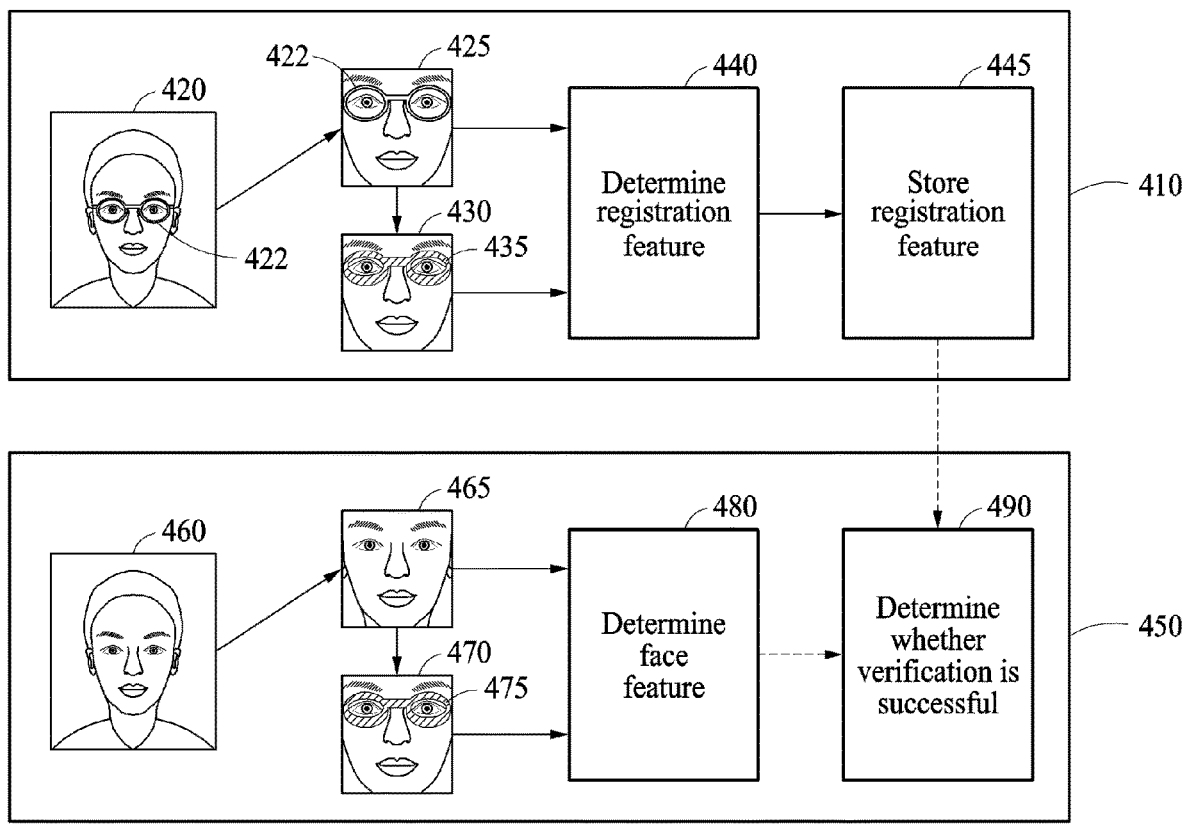

FIG. 4C illustrates an example of extracting the feature of the registered user face based on the face image including the occlusion region in the face registering process 410 and an example of extracting the feature extracted for the face verification based on the face image not including the occlusion region in the face verifying process 450. For example, the face registration is performed when a user wears glasses 422 in the face registering process 410, and the face verification is performed when a user does not wear the glasses 422 in the face verifying process 450. In the face registering process 410, the synthesized face image 430 is generated by replacing image information of a region corresponding to the masking region 435 in the face image 425 with image information of a reference image. Here, this may be similar to the operation of the verification process 450 of FIG. 4A, for example. With the masking region 435 including image information from the registration image, the glasses 422 are not represented in the synthesized face image 430. Subsequently, a registration feature is determined based on the synthesized face image 430 and the face image 425 in operation 440. The verification process 450 of FIG. 4C may be similar to the verification process 450 of FIG. 4B, for example.

Figure 4D:
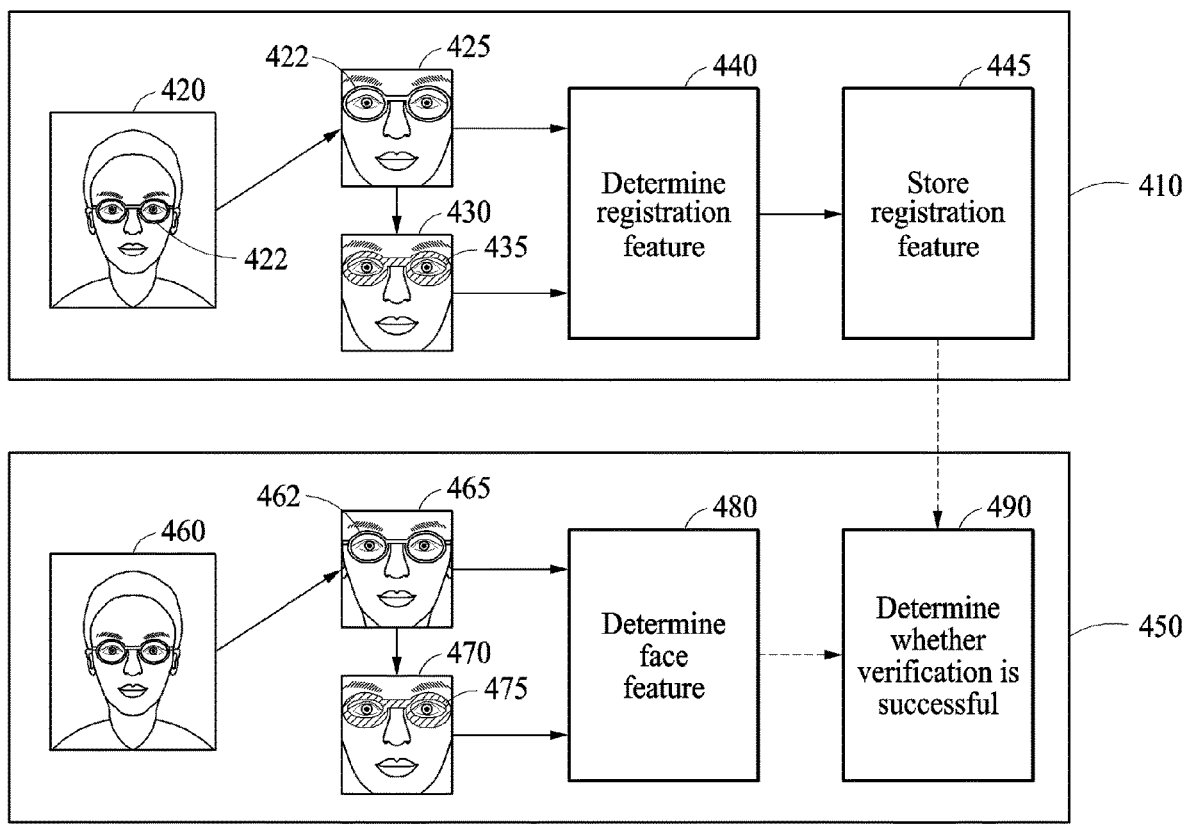

FIG. 4D illustrates an example of performing the face registration when a user wears the glasses 422 in the face registering process 410, and performing the face verification when a user also wears glasses 462 in the face verifying process 450. In this example, the face registering process 410 may operate the same as the registering process 410 of FIG. 4C, and the face verifying process 450 may operate of the same as the verifying process 450 of FIG. 4A. In the face registering process 410 of FIG. 4D, the synthesized face image 430 in which the glasses 422 have been occluded by the masking region 435 is generated. In the face verifying process 450, the synthesized face image 470 in which the glasses 462 have been occluded by the masking region 475 is generated. The registration feature is determined based on the synthesized face image 430 and the face image 425 in operation 440, and the verification feature is determined based on the synthesized face image 470 and the face image 465 in operation 480.

Figure 5:
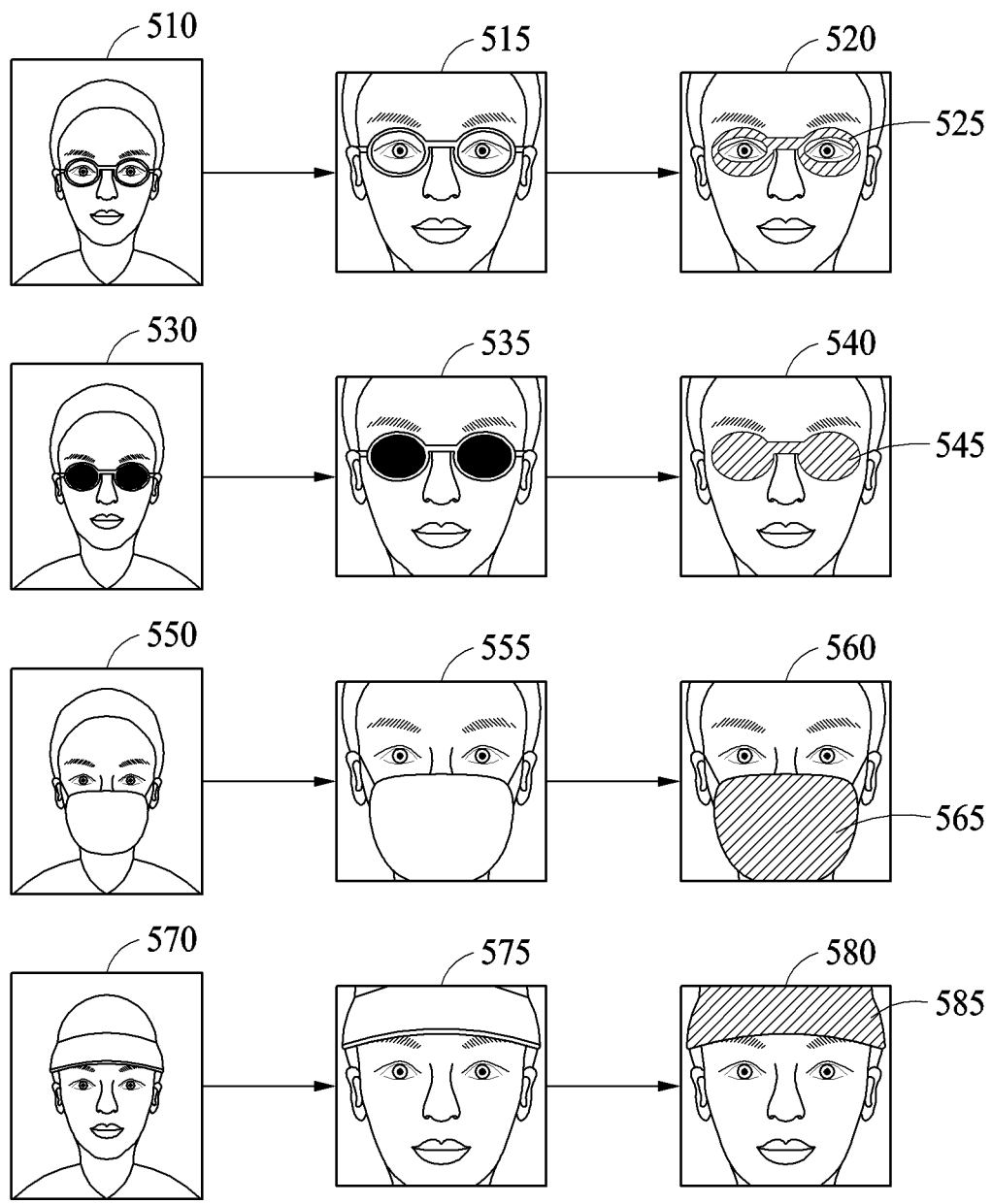
FIG. 5 illustrates examples of a synthesized face image.

FIG. 5 illustrates examples of a synthesized face image.

As illustrated in FIG. 5, a form of a synthesized face image may vary depending on a determined type of a masking region. As shown in images 510, 530, 550, and 570, an occluded region by a face occlusion element (or object), for example, glasses, sunglasses, a mask, or a hat, may be present in an image being a target of face verification (or face registration). A face region is detected from each of the images 510, 530, 550, and 570, and face images 515, 535, 555, and 575, representing the respective detected face regions, are obtained. Masking regions 525, 545, 565, and 585, respectively corresponding to the different example types of occlusion regions in the face images, 515, 535, 555, and 575 are determined, and synthesized face images 520, 540, 560, and 580 are generated by combining respective image information from the corresponding face images 515, 535, 555, and 575 with the alternate image information of corresponding regions of reference image(s) within the determined masking regions 525, 545, 565, and 585. For example, an entire face image 515 may be reproduced except for the masking region 525, for which image information from the reference image is relied upon, to collectively generate the synthesized face image 520. In an example, respective positions of the masking regions 525, 545, 565, and 585 may be determined based on positions of major facial parts, for example, eyes, noses, and mouths, detected from the face regions. The positions of the major facial parts may be determined based on a result of the detecting of the landmarks of the face image or the input image, for example. As illustrated in FIG. 5, the masking region 525 in the synthesized face image 520 has a form of glasses, and the masking region 545 in the synthesized face image 560 has a form of sunglasses. The masking region 565 in the synthesized face image 560 has a form of a mask, and the masking region 585 in the synthesized face image 580 has a form of a hat. The respective forms may be predetermined, respectively defined based on the corresponding detected occluding elements in the input image or face image, or be respectively determined from a selection between plural corresponding respective forms for each example type of occluding element based on such analyses of the occluding elements in the input image or face image or characteristics of the underlying face. Accordingly, the synthesized face images 520, 540, 560, and 580 respectively include the image information of the face images 515, 535, 555, and 575, and the image information of the reference image(s) allocated to the masking regions 525, 545, 565, and 585.

FIGS. 6A through 6D illustrate examples of a process of determining a face feature.

Figure 6A:
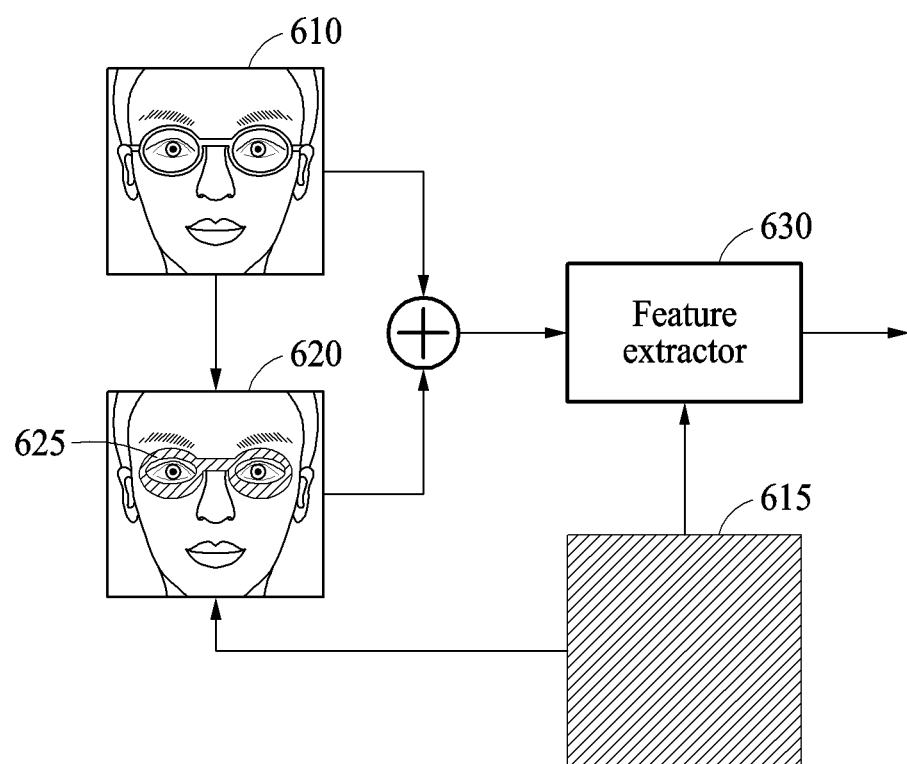
FIGS. 6A through 6D illustrate examples of a process of determining a face feature.

Referring to FIG. 6A, a face verifying apparatus generates a synthesized face image 620 by replacing image information of a reference image 615 into a masking region 625 within a face image 610. The reference image 615 may be, for example, an image having a single color in an entire region, an average value image, or an averaged image of two, or more, or all training images used for training a feature extractor 630 of the face verifying apparatus. Accordingly, a face feature of an input face represented in the face image 610 may be extracted based on the face image 610, the synthesized face image 620, and the reference image 615. Here, image information of the face image 610 is combined with image information of the synthesized face image 620, and then a result of the combining may be input to the feature extractor 630. For example, a result of summation of values of pixels at corresponding positions in the face image 610 and the synthesized face image 620 is input to the feature extractor 630. As another example, a result of concatenation of the image information of the face image 610 and the image information of the synthesized face image 620 is input to the feature extractor 630. In an example, the feature extractor 630 generates zero-centered data by subtracting the image information of the reference image 615 from input image information, and outputs feature information corresponding to the zero-centered data using a trained neural network model.

Herein, a neural network includes a plurality of layers, and each of the layers includes a plurality of nodes, and is implemented by one or more processors of the verifying apparatus. For example, there may be an input layer, at least one hidden layer, and an output layer. Depending on the architecture of the neural network, nodes included in neighboring layers may be selectively connected according to respective trained connection weights. For example, the neural network may be implemented by such a processor, i.e., the one or more processors of the verifying apparatus, configured to generate a neural network structure/architecture with such a plurality of layers each including plural nodes and configured to apply such weighted connections between neighboring nodes in neighboring layers of the neural network structure to interpret input data applied to the neural network structure, such as represented by the respective feature extractors 630, 635, 640, 645, and 650 of FIGS. 6A-6D. As only examples, herein such an 'interpretation' of input data may include a performed feature extraction, recognition, verification, or rejection, such as for image recognition or verification herein, as well as any other trained objective(s) of the respective layers, collection of layers, and/or whole neural network. Thus, based on the training data and desired interpretation objective(s), the architecture, selective connection between neighboring nodes, and corresponding connection weights may be varied during training until the neural network is trained to a desired acceptability for the desired interpretation objective(s). For example, in examples where the neural network is trained for the image verification or rejection, the neural network may include convolutional layers or be representative of a convolutional neural network (CNN), and thus the respective convolutional connection weights, e.g., for varying feature extractions through feature kernels, may be trained to an original desired acceptability for feature extraction and face verification or rejection operations, such as performed by the training apparatus 900 of FIG. 9. The neural network may also be of a different type of neural network and merely include one or more convolutional layers, e.g., for selective feature extraction, for other objectives. Returning to the training of the neural network, the resultant connection weights of the trained neuro network may be referred to as parameters of the neural network, e.g., demonstrated as at least trained kernel values of a convolutional layer or operation of the example CNN. For example, the neural network may be trained based on the labeled input image information or desired corresponding output images, classifications, or geometric parameters, such as through a loss considering backpropagation or simulated annealing algorithms. For example, the neural network may be trained to extract features of training data. Thus, in the training, connection weightings between nodes of different hidden layers or for kernels of convolutional layers are recursively adjusted until the corresponding neural network model is trained with a desired accuracy rate or below a maximum error rate, for example. The trained neuro network may be stored in a memory of the training or recognition apparatus, for example, in any of the verifying apparatuses discussed herein. In examples, the trained neural network may be stored in trained vectors, matrix or matrices, or other formats, e.g., where elements of the vectors, matrices, or other formats represent or suggest the corresponding trained weighted connections or kernels (parameters), as only examples, of the corresponding neural network structure. The stored trained neural network may further include hyper-parameter information, which may define the specific structure or architecture of the corresponding neural network for which the example stored trained parameters correspond to. The hyper-parameters may define the architecture or structure of the inputs and output layers as well as how many hidden layers there are and the function and structure/architecture of the respective hidden layers, such the respective arrangement and which are fully connected, recurrent, convolutional, de-convolutional, or pooling layers, as only examples. The hyper-parameters may further include information of the configuration and values of any bias and/or contextual nodes in the neural network, corresponding activation functions of the nodes, types of nodes, such as long short-term memory nodes, and define any or any further recurrent structures of the neural network, which may vary depending on embodiment and interpretation objective of the trained neural network.

Accordingly, before or during operations of FIGS. 6A-6D, as only examples, the verifying apparatus may acquire such trained parameters, and input the face images and synthesized face images as discussed herein to any of the extractors 630, 635, 640, 645, and 650 of FIGS. 6A-6D that are specially configured using the acquired trained parameters to perform the corresponding described operations as described with respect to extractors 630, 635, 640, 645, and 650, as only examples.

The one or more of the feature extractors 630, 635, 640, 645, and 650 referred to below in FIGS. 6A-6D may also be implemented only through a specially configured hardware module or implemented through hardware and instructions stored in/on non-transitory media, e.g., of or exterior to the verifying apparatus, that, when executed by one or more processors of the hardware, for example, cause the processor to implement any, any combination, or all of the operations described herein. In addition, though trained neural network implemented feature extractors have been discussed here with respect to FIGS. 6A-6D, embodiments are not limited thereto.

Figure 6B:
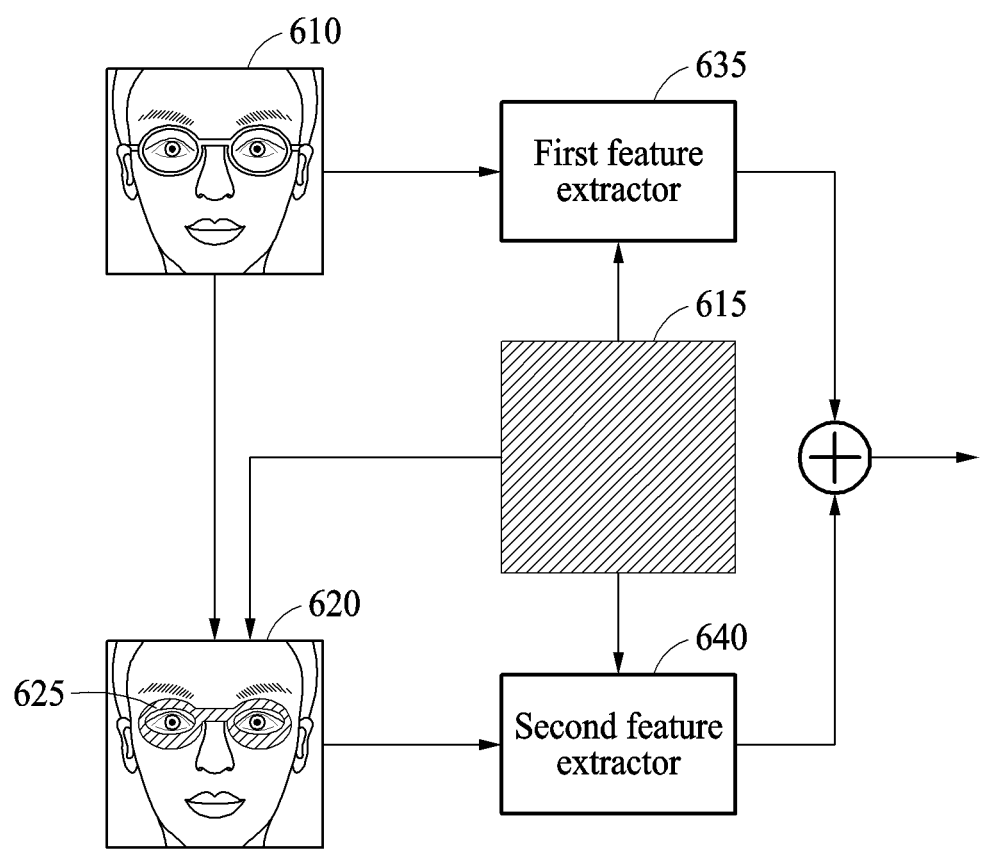

Thus, referring to FIG. 6B, a plurality of such feature extractors for obtaining face features are provided. A first feature extractor 635 extracts a first face feature from a first difference image between the face image 610 and the reference image 615. A second feature extractor 640 extracts a second face feature from a second difference image between the synthesized face image 620 and the reference image 615. A result of combining the first face feature and the second face feature may be determined to be a final face feature corresponding to the input face. For example, a result of summation or concatenation of the first face feature and the second face feature is determined to be a final face feature.

In an example where the first feature extractor 635 and the second feature extractor are each implemented through respective one or more neural network layers, the extracted feature results of each of such one or more neural network layers may be both provided to a same next layer of a subsequent neural network layer, noting that alternative implementations are also available. For example, by providing both extracted feature results to a same next layer, the summation or concatenation illustrated in FIG. 6B may be merely implemented by the operation of the next layer the extracted feature results are provided to.

Figure 6C:
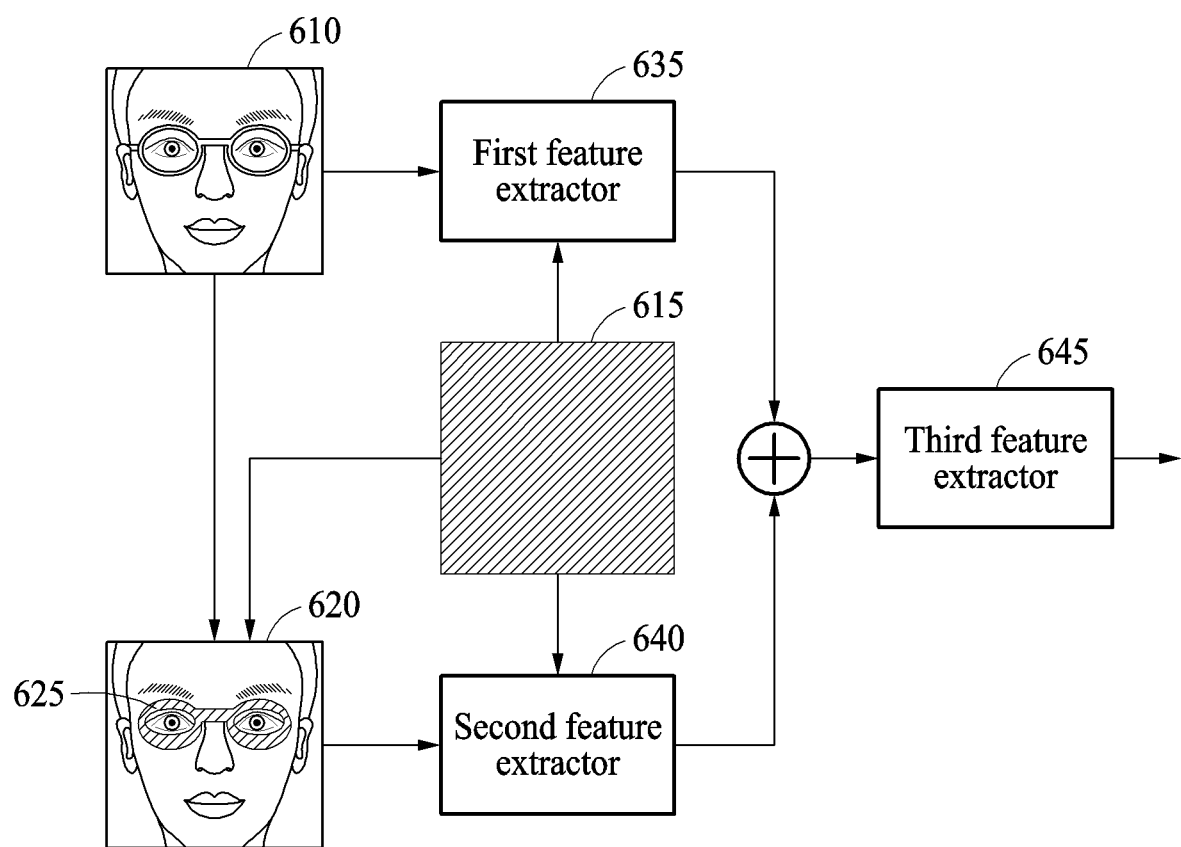

For example, as illustrated in FIG. 6C, this example result of combining the first face feature and the second face feature, respectively resulting from the first feature extractor 635 and the second feature extractor 640, may input to a third feature extractor 645, with a result output from the third feature extractor 645 being determined to be a final face feature.

Figure 6D:
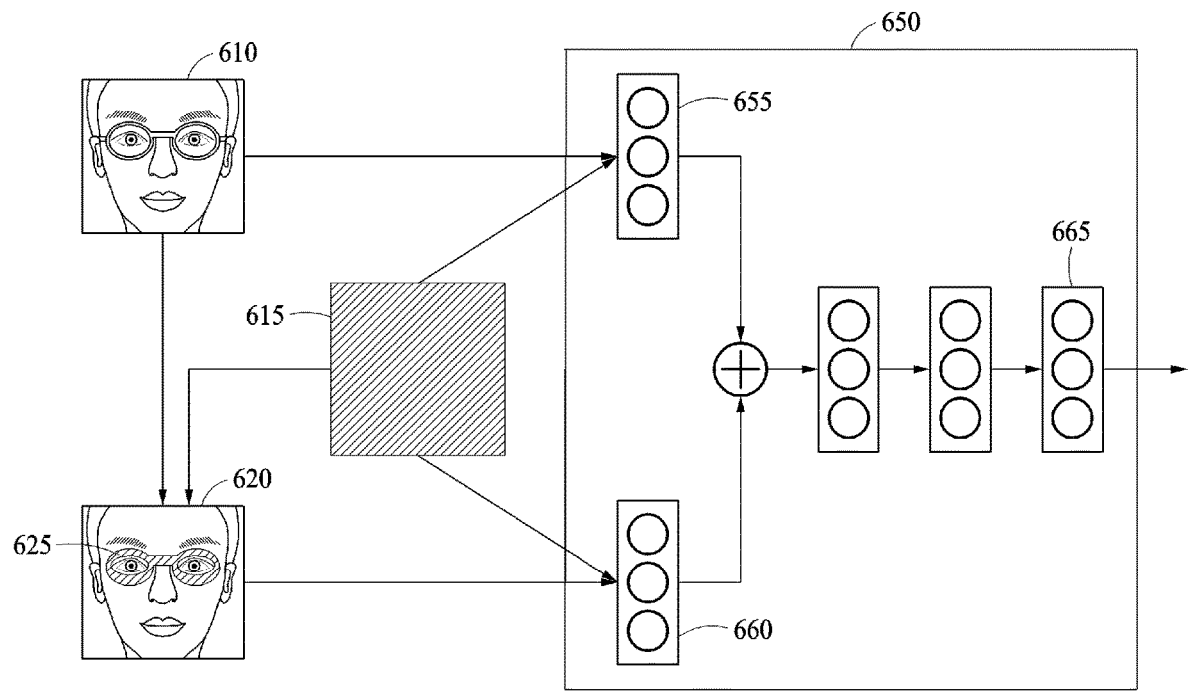

The first feature extractor 635, the second feature extractor 640, and the third feature extractor 645 illustrated in FIG. 6C may be provided as a feature extractor 650 implemented as a more detailed neural network example as illustrated in FIG. 6D.

Referring to FIG. 6D, image information of a first difference image between the face image 610 and the reference image 615 is input to a first input layer 655 of the neural network of the feature extractor 650, and image information of a second difference image between the synthesized face image 620 and the reference image 615 is input to a second input layer 660 of the neural network of the feature extractor 650. In an example, the first input layer 655 and the second input layer 660 are the aforementioned convolution layers or networks that are particularly configured and trained to extract features through respective convolutional operations that respectively perform feature extraction operations. The image information input the first input layer 655 and the second input layer 660 may be processed based on an operation of the neural network model of the feature extractor 650. The first input layer 655 and the second input layer 660 may be parallel operating convolutional layers or networks, for example, where the results of each of the respective feature extraction operations from the first input layer 655 and the second input layer 660 may be forwarded to, for example, a same next layer in the neural network of the feature extractor 650, e.g., represented by the layer after the illustrated summation or concatenation of the results of the first input layer 655 and the second input layer 660. Here, similar to an example of FIG. 6C, a feature corresponding to the first difference image may be combined with a feature corresponding to the second difference image in such an intermediate operation of the neural network operation of the feature extractor 650. An output layer 665 of the feature extractor 650 may output a face feature as an output corresponding to an input of the feature extractor 650. Alternatively, the illustrated layers may be a series of sequential fully connected or dense feed forward nodal layers terminating with output layer 665 that may operate as trained to analyze the finally extracted feature and output a valid or invalid indication the verification image, e.g., with respect to finally determined extracted features from a similar or same registration operation of the aforementioned example feature extractors 630, 635, 640, and 645, e.g., using a similar or same feature extractor 650. As another example, such sequential fully connected or dense feed forward nodal layer may be configured subsequent to the feature extractor 650 and be provided stored extracted features derived by the feature extractor 650 during the registration process and an example current resulting extracted feature by the feature extractor 650 during the verification process, to output such verification probability information and/or an indication of whether the similarity between one or more of the registration extracted features and one or more of the verification extracted features meets a predetermined verification threshold. Also, the layer structure of the feature extractor 650 illustrated in FIG. 6D is simplified for ease of description, but the layer structure of the feature extractor 650 is not limited thereto.

FIG. 7 is a block diagram illustrating an example of a face verifying apparatus. The verification apparatus 700 may be configured to perform any one or combination or all operations described above, noting that embodiments are also not limited thereto.

Referring to FIG. 7, a face verifying apparatus 700 receives an input image for face verification. The face verifying apparatus 700 determines whether verification is successful based on a result of comparing a face feature extracted from the input image to a registration feature which is pre-stored in a database 730. A valid user may register a face of the valid user in advance through any of the face registering processes discussed herein, and information on the registered face may be stored in the database 730.

The face verifying apparatus 700 performs one or more, any combination, or all processes, stages, or face verifying and/or registration operations described herein, and provides a result of face verification to a user. In addition, the face verifying apparatus 700 may also correspond to the training apparatus 900 of FIG. 9, and thus also be configured to implement the training of one or more or all example feature extractor models or neural networks described herein, as well as training of such models or neural networks to further provide the result of the face verification of a user as discussed herein.

The face verifying apparatus 700 includes at least one processor 710 and a memory 720. The memory 720 is a non-transitory computer readable media or device connected to the processor 710, and may store instructions, which when executed by the processor 710, cause the processor 710 to implement one or more or all operations described herein. The memory may further store data to be operated by the processor 710, or data processed by the processor 710. The memory 720 may further store trained parameters of one or more models or neural networks that, when applied, configure the processor 710 as described herein. The memory 720 may include, for example, a high-speed random access memory and/or a nonvolatile computer-readable storage medium (e.g., at least one disk storage device, a flash memory device, and other nonvolatile solid-state memory devices).

The processor 710 may be configured to perform one or more or all processes, stages, or operations described herein with reference to FIGS. 1-6 and 8-9. For example, the processor 710 may be configured to generate a synthesized face image by replacing a region that is predicted to have an occlusion region in the input image with other data. The processor 710 may be configured to detect a face region from an input image, generate a face image, and generate a synthesized face image by synthesizing the face image representing the face region with a reference image, based on a determined masking region. For example, the processor 710 may generate the synthesized face image by synthesizing image information, of a region corresponding to the masking region in the reference image, with image information of a remaining region excluding the masking region. The processor 710 determines one or more face features corresponding to an input face based on the face image and the synthesized face image. For example, the processor 710 may extract a first face feature from a first difference image between the face image and the reference image, and extract a second face feature from a second difference image between the synthesized face image and the reference image, and then determine a final face feature corresponding to the input face based on the first face feature and the second face feature. The processor 710 may determine whether verification is successful based on a determined similarity between the determined face feature and a registration feature.

FIG. 8 is a block diagram illustrating an example of a computing apparatus.

A computing apparatus 800 performs a face verifying process by obtaining an image in which a face of a user is represented, and performs a face verifying process by comparing a face feature extracted from the obtained image to a registration feature registered in advance. The computing apparatus 800 may correspond to the computing apparatus 120 of FIG. 1, the face verifying apparatus 700 of FIG. 7, as well as the training apparatus 900 of FIG. 9, as non-limiting examples.

The computing apparatus 800 includes a processor 810, a memory 820, a camera 830, a storage device 840, an input device 850, an output device 860, and a network interface 870. The processor 810, the memory 820, the camera 830, the storage device 840, the input device 850, the output device 860, and the network interface 870 communicate with one another through a communication bus 880.

The processor 810 may implement functions and instructions in the computing apparatus 800 as described herein. For example, the processor 810 may execute instructions stored in the memory 820 or the storage device 840. The processor 810 is configured to perform one or more or all processes, stages, or operations described with reference to FIGS. 1 through 9. In addition, the processor 810 is configured to control other functions of the computing apparatus 800. For example, the computing apparatus 800 may be mobile device, such as a mobile phone, tablet, or personal computer, and thus the processor 810 is further configured to implement other typical functions of the computing apparatus 800. In an example, the processor 810 may be configured to implement a lock-out operation to only permit a user to access or implement such other typical functions upon a successful verification of the user's captured face image.

The memory 820 is a non-transitory computer readable media or device that store information to be used for the face verification. The memory 820 includes a computer-readable storage medium or a computer-readable storage device. In addition, memory 820 is further representative of multiple such types of memory. The memory 820 stores the instructions to be implemented or executed by the processor 810 and stores related information during software or an application being executed by the computing apparatus 800.

The camera 830 captures a still image, a video, or both. The processor 810 may control the camera 830 to capture an image, e.g., including a face region, of a user attempting at the face verification, or may control the camera 830 to autonomously capture images and automatically verify a user, for example, without user initiation. In addition, as noted above, the camera 830 may also be controlled by the processor 810 during other functions of the computing apparatus 800, such as when operated as a personal camera.

The storage device 840 includes a computer-readable storage medium or a computer-readable storage device. The storage device 840 stores a database including information, for example, registration features, registered in a face registering process. In one example, the storage device 840 stores a greater amount of information than the memory 820, and stores the information for a long period of time. For example, the storage device 840 may include, for example, a magnetic hard disk, an optical disc, a flash memory, a floppy disk, and nonvolatile memories in other forms that are well-known in the technical field to which the present disclosure pertains.

The input device 850 receives the input from the user through a tactile, video, audio, or touch input. For example, the input device 850 may include a keyboard, a mouse, a touch screen, a microphone, and other devices configured to detect an input from a user and transfer the detected input to the computing apparatus 800.

The output device 860 provides the user with an output of the computing apparatus 800 through a visual, auditory, or tactile channel. For example, the output device 860 includes a display, a touch screen, a speaker, a vibration generator, and other devices configured to provide an output to the user.

The network interface 870 communicates with an external device through a wired or wireless network. The network interface 870 includes, for example, an Ethernet card, an optical transceiver, a radio frequency transceiver, or another network interface card configured to transmit or receive information. The network interface 870 communicates with an external device using Bluetooth, WiFi, or a third generation (3G), fourth generation (4G), or fifth generation (5G) communication method. The network interface 870 may further include a near field transceiver or the like. For example, through control of the processor 810 upon authentication of a user, the near field transceiver may transmit a payment authorization to an external terminal, such as with an appropriate mobile payment instruction transmitted by the near field transceiver. In addition, the processor 810 may control the network interface 870 to routinely check for updates for the registration and/or verification extractors and neural network(s), for example, and request, receive, and store parameters or coefficients of the same in the memory 820. For example, when the feature extractors and face verifying is implemented though the above example neural network feature extractors and/or face verifying networks, the processor 810 may request, receive, and store updated weighting matrices for any or all of the extractors or the face verifying network. In addition, updated hyper-parameters that can control or alter the configuration or architecture of such neural networks may also be requested, received, and stored along with corresponding weighting matrices in any of the memory 820 or storage device 840.

FIG. 9 is a block diagram illustrating an example of a training apparatus.

Referring to FIG. 9, a training apparatus 900 trains a feature extractor 930 used for face verification, such as discussed above with respect to FIGS. 6A-6D. In such examples, the feature extractor 930 is associated with one or more neural networks that are trained to output a result value corresponding to an input value, and trained based on a training image and a reference image. Here, the reference image may be identical to the reference image used in the above-described face registering process and face verifying process, though embodiments are not limited thereto.

The training apparatus 900 includes at least one processor 910 and a memory 920. The memory 920 is a non-transitory computer readable medium or device connected to the processor 910, and stores instructions implementable by the processor 910 to implement such training of the neural networks, data to be operated by the processor 910 or data processed by the processor 910 during the training of the neural networks. The memory 920 further stores the resultant trained parameters of the neural network(s) after training.

In response to a training image being input to the training apparatus 900, the processor 910 detects a face region from the training image, and generates a synthesized face image by synthesizing a face image representing the face region and a reference image, based on a masking region, e.g., similarly to the face registering and face verifying processes of FIGS. 2-6D, for example, with the processor 910 generating the synthesized face image by synthesizing image information of a region corresponding to the masking region in the reference image and image information of a remaining region excluding the masking region in the face image. The processor 910 extracts a face feature from the face image and the synthesized face image using the feature extractor 930, and connection weightings between nodes of different hidden layers are recursively adjusted until the corresponding neural network of the feature extractor 930 is trained with a desired accuracy rate or below a maximum error rate, for example, such as discussed above with the description of FIGS. 6A-6D. Thus, all above descriptions about face verifying processes are also applicable to the training apparatus 900. Further, the processor 910 may be configured to perform respective trainings to train the feature extractor 930 in accordance with any of the above examples, including the illustrated examples of FIGS. 6A through 6D, the descriptions of which are applicable to the resultant trained structure and operation of the feature extractor 930.

As noted above, during the training process, the processor 910 may further calculate a loss based on a difference between a feature extracted by the feature extractor 930 and a desired feature, and repetitively adjust parameters for the feature extractor 930 to reduce the calculated loss, until the feature extractor 903 is trained. For example, the training apparatus 900 gradually adjusts the parameters of the feature extractor 930 in a determined desirable direction by repeatedly performing the above-described processes with respect to each of plural training images. The trained feature extractor 930 may then be used in the face registering process and the face verifying process described above with respect to FIGS. 1-8.

The computing apparatus 120, camera 130, display 125, feature extractors 630, 635, 640, 645, and 650, face verifying apparatus 700, processor 710, memory 720, database 730, computing apparatus 800, processor 810, memory 820, camera 830, storage device 840, input device 850, output device 860, and network device 870, training apparatus 900, processor 910, memory 920, and feature extractor 930 in FIGS. 1-9 and that perform the operations described in this application are implemented by hardware components configured to perform the operations described in this application that are performed by the hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIG. 1-9 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions in the specification, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A computing apparatus comprising:
a camera configured to obtain a face image; and
a processor configured to
generate, without determining whether the face image includes an occlusion region, a synthesized face image by replacing a region of the face image that is predicted to include the occlusion region with image information of a reference image,
extract a feature from the face image and the synthesized face image using a trained neural network, and
determine whether verification is successful by comparing the extracted feature to a feature of a registered user face, wherein the feature of the registered user face is extracted from a face image and a synthesized face image of a valid user.

2. The computing apparatus of claim 1, wherein the occlusion region is a region of the face image including glasses, sunglasses, a hat, or a mask.

3. The computing apparatus of claim 1, wherein the occlusion region is included in the face image, and the face image of the valid user is a registered user face image not including the occlusion region.

4. The computing apparatus of claim 1, wherein either one or both of the face image and an image from which the feature of the registered user face is extracted does not include the occlusion region.

5. The computing apparatus of claim 1, wherein the region of the face image that is predicted to include the occlusion region is a region of the input image that is determined to be more likely to include the occlusion region.

* * * * *